(12) United States Patent
Shumate

(10) Patent No.: US 9,106,544 B2
(45) Date of Patent: Aug. 11, 2015

(54) MULTI-RATE STATISTICAL MULTIPLEXING

(75) Inventor: John Shumate, Encinitas, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 12/269,599

(22) Filed: Nov. 12, 2008

(65) Prior Publication Data

US 2010/0118697 A1 May 13, 2010

(51) Int. Cl.
*G01R 31/08* (2006.01)
*H04L 12/801* (2013.01)
*H04L 12/825* (2013.01)
*H04N 21/2343* (2011.01)
*H04N 21/2365* (2011.01)
*H04N 21/24* (2011.01)

(52) U.S. Cl.
CPC ............... *H04L 47/10* (2013.01); *H04L 47/11* (2013.01); *H04L 47/12* (2013.01); *H04L 47/25* (2013.01); *H04N 21/23439* (2013.01); *H04N 21/23655* (2013.01); *H04N 21/2402* (2013.01)

(58) Field of Classification Search
USPC .................................................. 370/229–240
See application file for complete search history.

(56) References Cited

U.S. PATENT DOCUMENTS

| 7,801,183 | B2 | 9/2010 | Gutman et al. | |
|---|---|---|---|---|
| 8,166,170 | B2 | 4/2012 | Segev et al. | |
| 8,451,719 | B2 | 5/2013 | Gutman et al. | |
| 2003/0067872 | A1* | 4/2003 | Harrell et al. | 370/229 |
| 2006/0189272 | A1 | 8/2006 | Willenegger et al. | |
| 2007/0039028 | A1 | 2/2007 | Bar | |
| 2008/0212471 | A1* | 9/2008 | Jowett et al. | 370/231 |
| 2009/0116400 | A1* | 5/2009 | Sekiya et al. | 370/252 |
| 2009/0154528 | A1* | 6/2009 | Bai et al. | 375/134 |
| 2010/0085887 | A1* | 4/2010 | Ray et al. | 370/252 |
| 2010/0322073 | A1* | 12/2010 | Namba et al. | 370/235 |

FOREIGN PATENT DOCUMENTS

| EP | 0759667 A2 | 2/1997 |
|---|---|---|
| KR | 10-2004-0069360 A | 8/2004 |
| WO | 2004/025405 A2 | 3/2004 |

OTHER PUBLICATIONS

PCT Search Report & Written Opinion, Re: Application #PCT/US2009/061574, May 31, 2010.
European Patent Office, Supplementary European Search Report in European Patent Application 09826518 Jan. 30, 2015.

(Continued)

*Primary Examiner* — Jung-Jen Liu
(74) *Attorney, Agent, or Firm* — Leydig, Voit & Mayer, Ltd.

(57) ABSTRACT

A multi-rate statistical multiplexing system is configured to determine whether a subscriber-line is in a congested-state. The subscriber-line provides one or more channels requested by a subscriber. The system selects a version among different versions of each requested channel based on the level of congestion and an indicator of perceived quality of viewing experience of each requested channel. The system switches to the selected version of each channel and the perceived quality of viewing experience is maintained after switching.

20 Claims, 10 Drawing Sheets

(56) References Cited

OTHER PUBLICATIONS

Davini et al., "Perceptually-Evaluated Loss-Delay Controlled Adaptive Transmission of MPEG Video over IP" New Frontiers in Telecommunications, 2003 IEEE International Conference on Communications; ICC 2003; May 11-15, 2003, Anchorage, Alaska, USA; pp. 577-581, (May 11, 2003).

System Dynamics Inc., "Sandy and Dave's Report on the Broadband Home," Jul. 10, 2008. <http://www.broadbandhomecentral.com/report/backissues/Report0804_6.html>.

* cited by examiner

MULTI-RATE STATISTICAL MULTIPLEXING

RELATED APPLICATIONS

This patent application is related to U.S. patent application Ser. No. 12/250,317, titled, "Multi-Rate Encoder with GOP Alignment," filed on Oct. 13, 2008. The above-identified patent application is hereby incorporated by reference in its entirety.

BACKGROUND

Satellite and digital cable high definition (HD) television are available in the television industry today. Now, however, telephone companies are improving the technology of Internet Protocol Television (IPTV) to establish IPTV as an alternative that is more desirable than satellite and cable television. Therefore, one goal of IPTV is to competitively offer HD television, and more. Telephone companies contemplate this via "triple play," a subscriber service of voice, data and video.

One challenge, however, involves a transmission bottleneck due to the narrow "copper pipe" (narrow bandwidth) through that video data must travel in the "last mile" of the path of transmission between a digital television service provider and a subscriber home. Conventionally, the DSLAM (digital subscriber-line access manager) marks the "edge" or beginning of the "last mile" in IPTV. Typically, a wide "fiber optic pipe" having an abundance of bandwidth leads to the DSLAM. In addition, the narrow copper pipe connects the DSLAM to the subscriber premises. Essentially, the copper pipe is the traditional telephone line infrastructure that already exists.

One particular issue with the copper pipe is that it rapidly attenuates video data with distance and therefore the bandwidth of the copper pipe substantially degrades from its peak bit-rate the further the distance from the DSLAM to the subscriber. A subscriber who is too far from the DSLAM has an impaired subscriber-line. An impaired subscriber-line is characterized as having less throughput than the peak bit-rate of whatever physical medium transmission technology is used to convey data across the physical medium. A subscriber who requests too much bandwidth creates a congested-state subscriber-line. A congested-state subscriber-line is characterized as having less throughput than bandwidth requested by the subscriber.

Typically in IPTV, a channel is not forwarded from the DSLAM to the subscriber unless a subscriber has specifically requested to view the channel. In this, consider three scenarios involving a second person requesting to view a second channel when a first viewer is already viewing a first channel.

In the first scenario, note, an HD channel is 8 Mbps and an SD (standard definition) channel is 4 Mbps. The copper pipe between the DSLAM and a particular subscriber premises is characterized as having a bandwidth of 12 Mbps in total. One viewer at the subscriber premises is watching a television program on an HD channel (8 Mbps). Another viewer at the same subscriber premises, using a different television, then attempts to watch a different program on an SD channel (4 Mbps). Because the bandwidth requested is 12 Mbps in total (8 Mbps+4 Mbps=12 Mbps), both viewers have a positive experience of watching the television programming each requested to watch.

In the second scenario, nearly all circumstances are the same except the subscriber-line is an impaired line having available bandwidth of only 11 Mbps in total. In this second scenario, the subscriber premises is further from the DSLAM when compared to the subscriber premises in the first scenario, and thus there is less bandwidth available. The first viewer is watching one SD channel (4 Mbps) and the second viewer requests one HD channel (8 Mbps). Here, the question is: what is the desired outcome? If the system grants priority to the most recent request of the second viewer and entirely shuts down service to the first viewer due to insufficient bandwidth, then it is likely that the first viewer will be unhappy. Further, the consequence of denial is 3 Mbps of unused bandwidth in total (11 Mbps−8 Mbps=3 Mbps).

In the third scenario, there is also an impaired subscriber-line having available only 11 Mbps of bandwidth in total. The first viewer is watching one HD channel (8 Mbps) and the second viewer requests one SD channel (4 Mbps). Here, again, the question is: what is the desired outcome? If the system grants priority to the more recent request of the second viewer and entirely shuts down service to the first viewer due to insufficient bandwidth, then it is likely the first person will be unhappy. Perhaps the first person will be particularly unhappy to know that the consequence of denial is 7 Mbps of unused bandwidth in total (11 Mbps−4 Mbps=7 Mbps). Not to mention, the service provider will also be unhappy that 7 Mbps of available bandwidth are unused.

It would therefore be beneficial to have a system that cost effectively maximizes the available bandwidth and minimizes degradation and disruption to viewing experience in situations involving requests for more video data than can actually fit through the pipe.

BRIEF DESCRIPTION OF THE DRAWINGS

Features of the present invention will become apparent to those skilled in the art from the following description with reference to the figures, in which.

DETAILED DESCRIPTION OF THE INVENTION

Figure 1A:
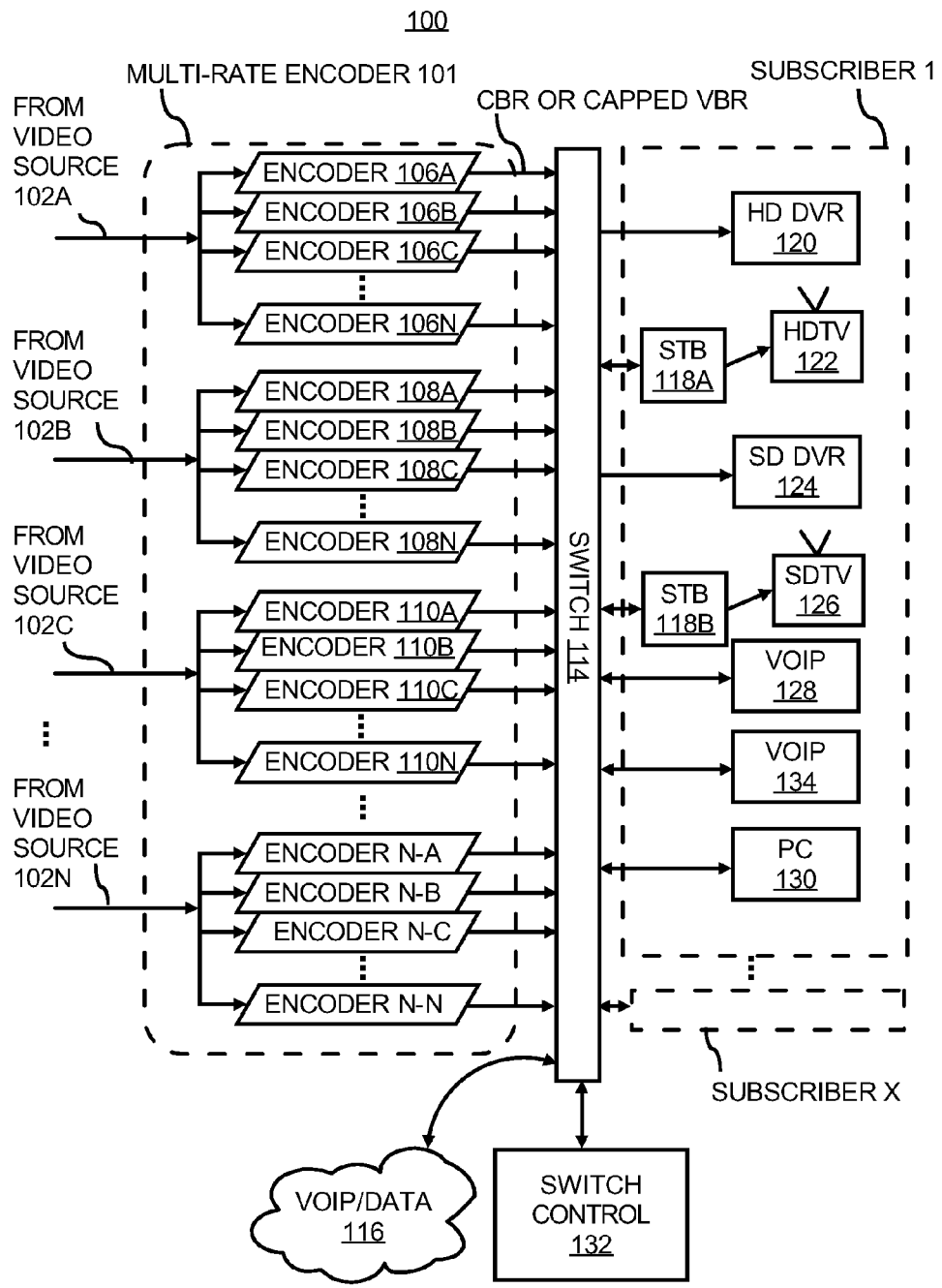
FIG. 1A shows a simplified block diagram of a GOP (Group of Pictures)-aligning multi-rate encoding system configured to perform various functions described herein and operable to maintain a perceived quality of viewing during switching events, according to an embodiment of the invention.

For simplicity and illustrative purposes, the present invention is described by referring mainly to embodiments thereof. In the following description, numerous specific details are set forth in order to provide a thorough understanding of the embodiments. It will be apparent however, to one of ordinary skill in the art, that the embodiments may be practiced without limitation to these specific details.

Systems and methods disclosed herein cost effectively maximize bandwidth on a subscriber-per-subscriber basis in a manner that leverages available bandwidth on a congested subscriber-line by balancing perceived quality, bit-rate of each channel requested by a subscriber, and one or more indicators of perceived quality of viewing experience of each channel requested by a subscriber. In addition, the systems and method disclosed herein minimize disruption of viewing experience during switching events between different bit-rate versions of the same channel and minimizes degradation of perceived viewing experience after switching events between different bit-rate versions of the same channel.

An encoding system, according to an embodiment, is configured to encode the same channel, e.g., the same video data, at different bit-rates. A multi-rate statistical switching system is configured to select a version of each channel requested by a subscriber and forward to the subscriber depending on the level of congestion of the subscriber's subscriber-line, one or more indicators of perceived quality of viewing experience of each channel requested by the subscriber, and the bit-rate of each channel requested by a subscriber. This can be used to accommodate varying bandwidths for different subscribers connected to the same narrow copper pipe in the "last mile." For example, in the second and third scenarios described above, instead of denying service to one of the viewers trying to watch a particular channel, the encoding system forwards the channel at a lower bit-rate. As an example in the second scenario, video data of the first channel may be forwarded at 7 Mbps instead of 8 Mbps. In the third scenario, the video data of the first channel may be forwarded at 3 Mbps instead of 4 Mbps. The subscriber may perceive a slight degradation in service, but the service is tolerable, especially with respect to the alternative of not receiving the channel at all. However, upon a determination, prior to the switch, by the multi-rate statistical switching system that an indicator of a perceived quality of viewing experience of each channel is comparable even at the lower bit-rates, a perceived quality of viewing experience may be maintained after switching even though switching to the lower bit-rates.

In addition, a switching system, according to an embodiment, is configured to forward multiple channels requested by a subscriber, whose subscriber-line is in a congested-state, by dynamically balancing available bandwidth and perceived video quality. The dynamic balancing can be performed on a subscriber-per-subscriber basis to accommodate variations of complexity of video data on each channel requested by each subscriber. For example, in the second and third scenarios described above, instead of denying service to one of the viewers trying to watch a particular channel, the switching system dynamically adjusts the bit-rate between two requested channels. As an example, when a perceived quality of viewing experience of the first channel requested by the first viewer can be maintained at a lower bit-rate (for instance, due to less complexity of video data in the first channel requested by the first viewer), the bit-rate of the first channel is lowered and the perceived quality of viewing experience is maintained. In addition, when perceived quality of viewing experience of the second channel cannot be maintained without increasing the bit-rate of the second channel (for instance, due to increased complexity of video data in the second channel requested by the second viewer), the bit-rate of the second channel is increased to maintain the quality of viewing experience.

Turning first to FIG. 1A, there is shown a block diagram of a GOP-aligning multi-rate encoding system 100, according to an embodiment of the present invention. It should be understood that the encoding system 100 may include additional components and that some of the components described herein may be removed and/or modified without departing from the functionality of the encoding system 100.

The multi-rate encoding system 100 includes a multi-rate encoder 101, encoder-set 106A through 106N, encoder-set 108A through 108N, and so forth, including encoder-set N-A through N-N, switch 114, switch control 132, and VOIP/DATA 116. In addition, the multi-rate encoding system 100 includes Subscriber 1. Subscriber 1, for example, includes two set top boxes (STBs 118A and B), one HD digital video recorder (HD DVR 120), one HD television (HDTV 122), one SD digital video recorder (SD DVR 124), one SD television (SDTV 126), two Internet Protocol telephones (VOIP 128 and 134), and one personal computer (PC 130). Not shown is customer premises equipment (CPE) for Subscriber 2 through Subscriber X. However, it should be clear that Subscriber 2 through Subscriber X may include CPE similar to Subscriber 1, including any combination thereof.

The multi-rate encoder 101 receives a plurality of channels from video sources 102A through 102N. As an example, content from the video source 102A will be discussed. The content from the video source 102A includes video data received from a broadcaster or some other video data source, and the multi-rate encoder 101 may be located in a central office, head end, neighborhood node or other location for receiving content from the video source 102A. Content from the video source 102A may be received via satellite broadcast, fiber transmission, Internet, private wideband backbone, or via other known transmission media. Content from the video source 102A may include programming that had been stored remotely before it was received. In addition, content from the video source 102A may be locally stored after it is received. Further, content from the video source 102A may be received according to one or more schedules. In addition, content from the video source 102A may be received via multicast transmission (transmission to multiple destinations) or unicast transmission (transmission to one destination). For instance, content from the video source 102A may be video on demand (VOD) that may be forwarded to one destination. In addition, content from the video source 102A may be received in different formatting including HD, SD, or other well-known video digital data formatting and/or standard. Each of the video sources 102B through 102N is similar to the video source 102A, as will be discussed.

The multi-rate encoder 101 includes the encoder-sets 106, 108, including the encoder-set N. For instance, the encoder-set 106 includes the encoders 106A through 106N for encoding of content from the video source 102A into multiple streams of encoded video data at different bit-rates. Similarly, each of the remaining encoder-sets 108 through N respectively receives content from the video sources 102B through 102N. In addition, each of the encoder sets 106 through N respectively encode the corresponding content from the video sources 102A through 102N into corresponding "service-sets" each having multiple streams of video data of a channel encoded at different bit-rates. For example, the encoder-set 108A through 108N comprises N encoders, wherein N is an integer greater than 1. The encoder-set 106 encodes content from the video source 102A into N different streams of encoded video data at N different bit-rates. For example, let N=4 for the encoder-set 106. Here, the encoder-set 106 includes the encoder 106A, 106B, 106C and 106D. The encoder-set 106 encodes content from the video source 102A into four streams of encoded video data at four different bit-rates. For example, the first stream may be encoded at 100% bit-rate, the second stream may be encoded at 90% bit-rate, the third stream may be encoded at 80% bit-rate and the fourth stream may be encoded at 70% bit-rate. Together, these four encoded streams of video data constitute one service-set each comprising a stream of encoded-GOPs.

Each of the video sources 102A through 102N provides content for a different channel. For example, each of the video sources 102A through 102N may be multicast, such as content provided by ABC, NBC, CBS, FOX, etc., or unicast, such as content provided by VOD, or a combination thereof.

Content from the video source 102A is an "original stream." An original stream is a stream of uncompressed image frames. For example, an original stream may be at a rate of approximately 30 frames per second. In this, content from the video source 102A is characterized as "raw video." Content from the video source 102A may be in a well-known format such as a 4:2:2 format. It should be clear however, content from the video source 102A through 102N may be of a different format from 4:2:2; such as in a 4:2:0 format, or in other well known appropriate formats.

Assume an example involving ADSL2+ (Asymmetric Digital Subscriber-line 2+) that comprises a bit-rate of 24 Mbps in total (between the encoder-set 106 and the premises of Subscriber 1). For example, let content from the video source 102A be one HD channel of video data. Here, the encoder-set 106 encodes the content from the video source 102A. After encoding by the encoder 106A, the bit-rate of the encoded content from the video source 102A is 8 Mbps in total.

In this example, assume further, the encoder-set 106 comprises four encoders. Therefore, the encoder-set 106 includes the encoders 106A, 106B, 106C and 106D. Each of the remaining encoders 106B through 106D encodes content from the video source 102A at different lower bit-rates. For example, the encoder 106B is a 90% bit-rate encoder having a 10% loss and thus a throughput of 7.2 Mbps in total (8 Mbps×0.90=7.2 Mbps). The encoder 106C is an 80% bit-rate encoder having a 20% loss and thus a throughput of 6.4 Mbps in total (8 Mbps×0.80=6.4 Mbps). Finally, the encoder 106D is a 70% bit-rate encoder having a 30% loss and thus a throughput of 5.6 Mbps in total (8 Mbps×0.70=5.6 Mbps). It can be said that these four streams of encoded video data at different bit-rates is a "service-set" of a channel from video source 102A.

Note also that each the encoders in the encoder-set 106 may comprise "capped bit-rate" encoding. Capped bit-rate encoding may be employed in situations involving lower complexity such as very little change in picture information from one picture to another picture. In this regard, the capped bit-rate encoding by the encoder 106A may be employed when such encoding at a lower bit-rate results in no perceived degradation of the quality of viewing experience when compared to encoding at a constant bit-rate. For example, when the encoder 106A encodes at a capped bit-rate, the encoder 106B encodes at a bit-rate of 90% of the capped bit-rate of the encoder 106A, the encoder 106C encodes at a bit-rate of 80% of the capped bit-rate of the encoder 106A, and the encoder 106D encodes at a bit-rate of 70% of the capped bit-rate of the encoder 106A. For example, the video source 102A may be encoded by encoder 106A at a lower bit-rate than a constant bit-rate of 8 Mbps in total. For example, if encoding by the encoder 106A can encode at 5 Mbps with little to no change in perceived degradation of the quality of viewing experience (when compared to perceived quality of viewing experience at the constant bit-rate of 8 Mbps), the encoder 106A encodes the video source 102A at 5 Mbps. Similarly, the encoder 106B encodes the video source 102A at 4.5 Mbps in total (90% of 5 Mbps=4.5 Mbps), the encoder 106C encodes the video source 102A at 4 Mbps in total (80% of 5 Mbps=4 Mbps), and the encoder 106D encodes the video source at 3.5 Mbps in total (70% of 5 Mbps=3.5 Mbps.)

In a fourth scenario, a first viewer at Subscriber 1 watches content from the video source 102A (one HD channel) via HDTV 122. Using an HD video recorder (DVR 120), the first viewer also records another HD channel, for instance content from the video source 102B. Therefore, the first viewer is using a bandwidth of 16 Mbps in total (8 Mbps+8 Mbps=16 Mbps). At the same time, a second viewer at Subscriber 1 attempts view content from source 102C of an SD channel (4 Mbps) on a standard definition television (SDTV 126). Using a standard definition digital video recorder or the SD DVR 124, the second viewer also attempts to record another SD channel (4 Mbps) of content from the video source 102N. In this example, the bandwidth needed of 24 Mbps in total (8 Mbps+8 Mbps+4 Mbps+4 Mbps=24 Mbps) and exceeds the available bandwidth of 22.8 Mbps.

Given that the requested bandwidth exceeds the available bandwidth of the subscriber-line, the switch control 132 selects, on a channel-by-channel basis, one or more video streams having lower bit-rates in order to forward all the desired channels to Subscriber 1. For instance, depending on bandwidth availability, complexity of each video channel, and weight of each channel, the switch control 132 determines which encoded bit-rate stream, from the service-sets corresponding to the video sources 102A through 102N, to forward to the Subscriber 1. For example, complexity can be received by the switch control 132 as side information or meta data that has been embedded in each video source by the corresponding encoder-set 106, 108 and so forth.

As an option, a subscriber such as Subscriber 1 may customize the settings of the Subscriber 1's service and thereby bias specific channels, channel content, or a combination thereof. For example, the Subscriber 1 may give priority to all sports events when broadcast in high definition.

In a fifth scenario, the first viewer at Subscriber 1 watches the channel having content from the video source 102A (one HD channel) and records the channel having content from the video source 102B (one HD channel). Let priority be given to the channels from the video sources 102A and 102B due to these being sporting events in high definition format. Also, let the subscriber-line be an impaired subscriber-line such that the bandwidth of the impaired subscriber-line is 22.5 Mbps in total. Let the second viewer attempt to view content on the channel from the video source 102C (one SD channel at 4 Mbps) and let the second viewer attempt to record content on the channel from the video source 102D (one SD channel at 4 Mbps). Here, the Subscriber 1 requests 24 Mbps in total (8 Mbps+8 Mbps+4 Mbps+4 Mbps=24 Mbps.) Due to the impaired subscriber-line at 22.5 Mbps in total, the Subscriber 1 has requested an unavailable bandwidth of 1.5 in total (24 Mbps−22.5 Mbps=1.5 Mbps.) Due to priority given to content on the channels from the video sources 102A and 102B, the switch 114, under control of the switch control 132, automatically switches the channel from the video source 102C from the 100% encoded version to the 80% encoded version. Similarly, the switch 114 switches the channel from the video source 102D from the 100% encoded version to the 80% encoded version. After automatically switching, the channels requested by the Subscriber 1 add up to 22.4 Mbps total (8 Mbps+8 Mbps+4 Mbps at 80%+4 Mbps at 80%=22.4 Mbps). Thus, instead of all together denying the channel requested by the second viewer, the second viewer may receive mildly degraded video of the channels from the video sources 102C and 102D. For instance, all four channels may still be forwarded to the Subscriber 1 on the corresponding subscriber-line. The channels are not at all degraded or denied from the video source 102A and 102B due to being designed as the greatest value to the subscriber (for instance, based on a predefined subscriber preference). Note also that this scenario results in an unused bandwidth of 0.1 Mbps in total and thus nearly entirely maximizes available bandwidth.

Although not specifically discussed, each Subscriber 2 through X may request content requiring varying amounts of bandwidth. Similar to the example involving Subscriber 1, any number of factors may cause the switch control 132 to switch among the different bit-rates of a service-set of any given channel. When bandwidth-demand exceeds bandwidth-availability in an example involving Subscriber 2 for instance, the switch control 132 automatically controls the switch 114 to select among different bit-rates of a channel requested by Subscriber 2 based on similar criteria.

Figure 1B:
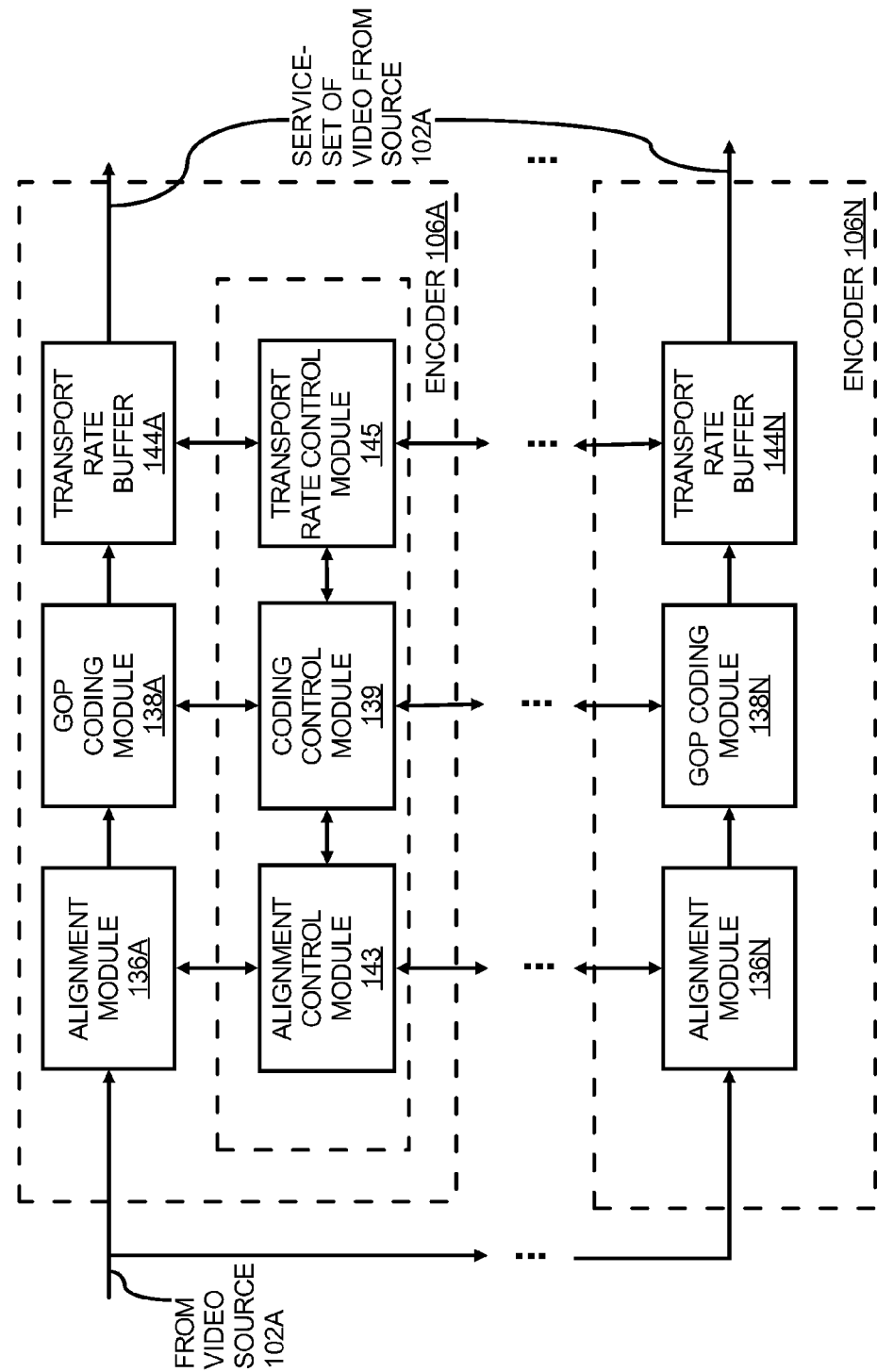
FIG. 1B shows a simplified block diagram of a GOP-aligning multi-rate encoding apparatus configured to perform various functions described herein including rate control by transport rate buffering to maintain a perceived quality of viewing during switching events, according to an embodiment of the invention.
Figure 1C:
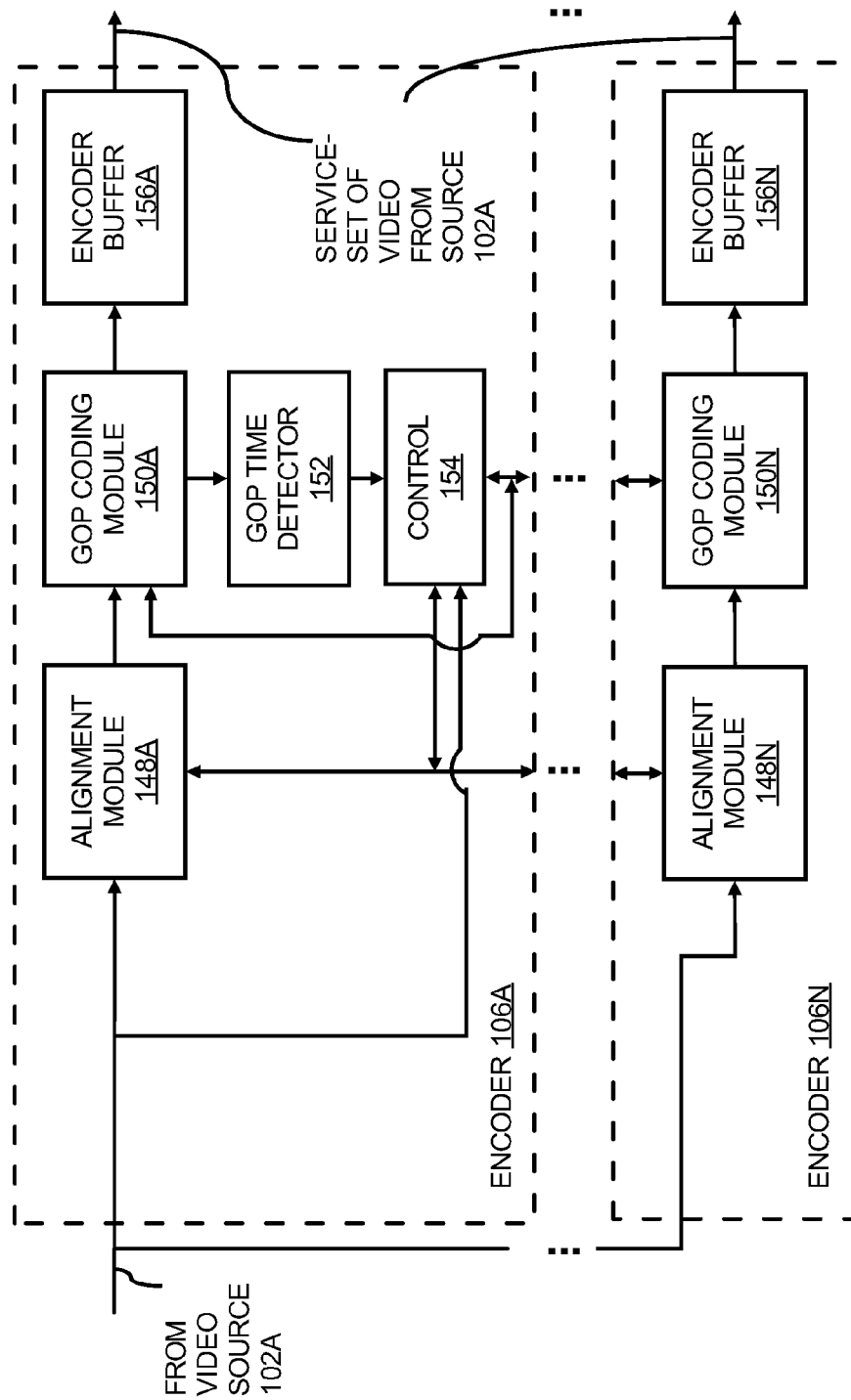
FIG. 1C shows a simplified block diagram of a GOP-aligning multi-rate encoding apparatus configured to perform various functions described herein and operable to perform rate control by preprocessing and/or multi-pass coding to maintain a perceived quality of viewing during switching events, according to another embodiment of the invention.
Figure 1D:
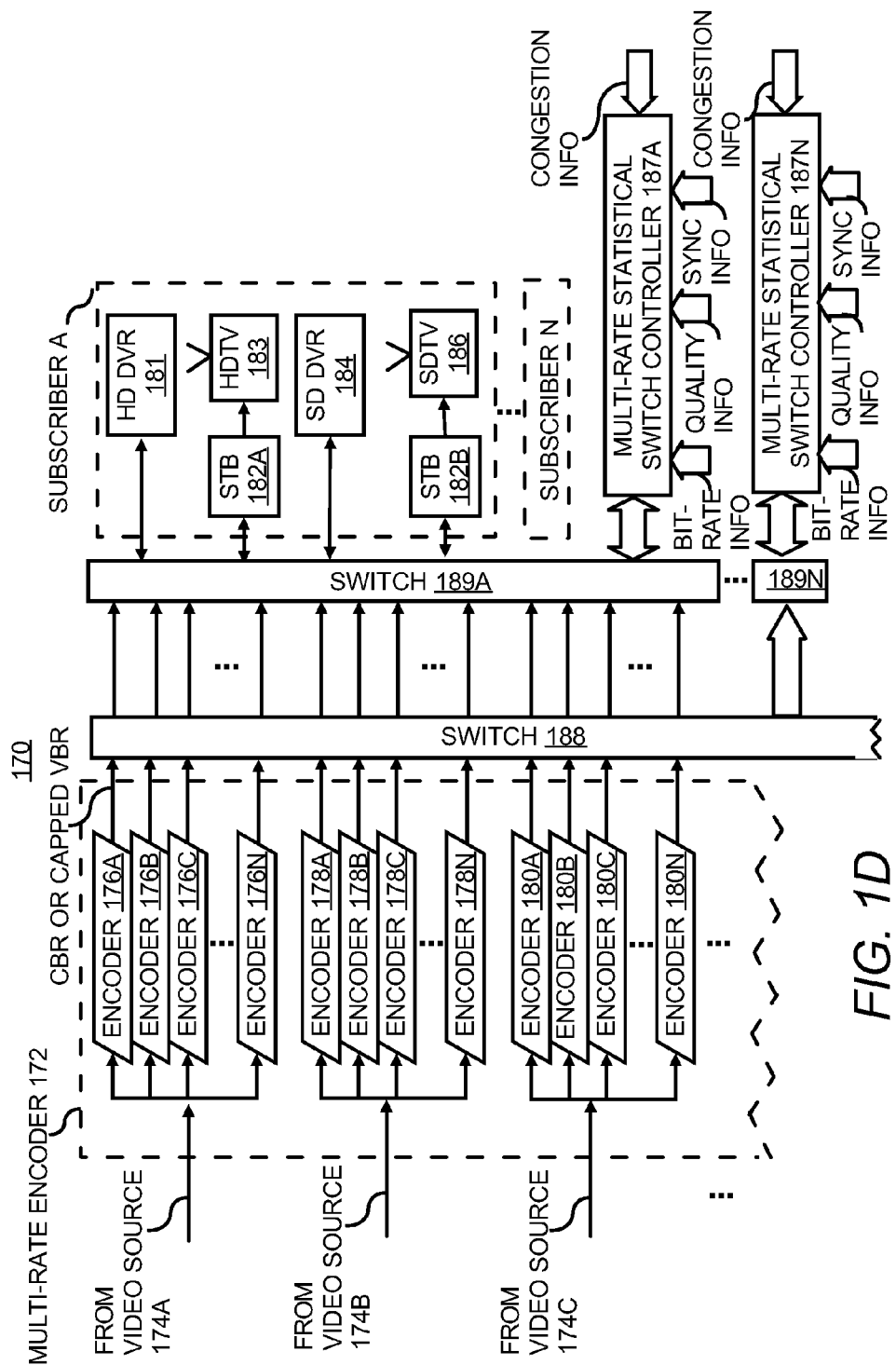
FIG. 1D shows a simplified block diagram of a multi-rate statistical multiplexing system configured to perform various functions described herein and operable to maintain a perceived quality of viewing after switching events, according to an embodiment of the invention.

Note also that each of the encoder-sets 106 through N may operate according to various embodiments of the present invention including the embodiments shown FIGS. 1B through 1D as well as those illustrated in methods of FIGS. 2, 3A, 3B and 3C.

FIG. 1B shows modules and hardware for encoders in an encoder-set 106A-N according to an embodiment. Note that the embodiment of FIG. 1B is applicable to any of the encoder-sets 106, 108, 110, and so forth through N, as shown in FIG. 1A. Similarly, the embodiment of FIG. 1B is applicable to the encoder-sets 176, 178 and 180 as described in the embodiments of FIGS. 1D, 1E and 3C.

FIG. 1B shows the encoder 106A of the encoder-set 106 that includes an alignment module 136A, an alignment control module 143, a GOP coding module 138A, a coding control module 139, a transport rate buffer 144A, and a transport rate control module 145.

The encoder 106A is a master encoder and the encoders 106B through 106N are slave encoders. In the embodiment of FIG. 1B, the master encoder 106A and the slave encoder 106N are shown, whereas the slave encoders 106B through 106N−1 are not shown. However, the slave encoders 106B through 106N−1 include similar features as described for the slave encoder 106N but may not include all of the features shown for the master encoder 106A. In this, the master encoder 106A and the slave encoders 106B through 106N may respectively include a plurality of alignment modules 136A through 136N, a plurality of GOP coding modules 138A through 138N, and a plurality of transport rate buffers 144A through 144N. In contrast, the master encoder 106A may include more features than the slave encoders 106B through 106N. For example, the master encoder 106A includes the alignment control module 142, the coding control module 139 and the transport rate control module 145.

The channel from the video source 102A is simultaneously received by the encoders 106A through 106N via a Serial Digital Interface (SDI) port. Here, the video data from the video source 102A is raw video data. For example, the video data from the video source 102A has a 4:2:2 format. Note that the video data from the video source 102A may comprise other formats too. As another example, the video data from the video source 102A may have a 4:2:0 format, or may have any other well format appropriate for this embodiment. For example, the video data from the source 102A may comprise markers or flags that may be used to identify picture boundaries. For instance, the alignment modules 136A through 136N receive the video data from the video source 102A containing unencoded pictures in display order. Upon receipt, each of the alignment control modules 136A through 136N may identify picture boundaries in the video data from the video source 102A based on markers or flags embedded therein.

Each of the alignment modules 136A through 136N is configured to identify boundaries of an unencoded picture. Further, each of the alignment modules 136A through 136N is configured to detect one or more characteristics/metrics of a particular unencoded picture. For instance, each alignment module 136A through 136N may detect an average number of bits in an identified unencoded picture, the DC level of an identified unencoded picture, the variance level of an identified unencoded picture, or whether there is a scene change at an identified unencoded picture. The alignment modules 136A through 136N may forward one more of such metric to the alignment control module 143 (of the master encoder 106A). In this example, the master encoder's alignment control module 143 may compare the metrics received from the corresponding alignment modules 136A through 136N. Based on a match of same or similar metrics received from the corresponding alignment modules 136A through 136N, the alignment control module 143 may identify the same picture within the alignment modules 136A through 136N.

Once the alignment control module 143 identifies the same picture within the alignment modules 136A through 136N, the alignment control module 143 may control the alignment modules 136A through 136N to forward the same unencoded picture from their respective input video source 102A to the corresponding GOP coding modules 138A through 138N.

The coding control module 139 (of the master encoder 106A) controls the GOP coding module 138A as well as the GOP coding modules 138B through 138N (of the slave encoders 106B through 106N). In this, the GOP coding modules 138A through 138N encode a same group of pictures beginning on the same boundary of the same picture. Furthermore, the coding control module 143 produces synchronization references, as will be discussed further below.

Once the GOP coding modules 138A through 138N receive the same unencoded picture, the coding control module 139 may control the GOP coding modules 138A through 138N to begin coding on the boundary of the same unencoded picture (at the start of the same picture). The same unencoded picture may be the first unencoded picture in a group of unencoded pictures of which the GOP coding modules 138A through 138N may encode.

Once the GOP coding modules 138A through 138N encode the same unencoded GOP, the GOP coding modules 138A through 138N continue on, and thus receive subsequent unencoded GOPs beginning with the next unencoded GOP that follows the first encoded GOP. The GOP coding modules 138A through 138N continue by encoding, GOP-by-GOP, on the boundary of the first unencoded picture that follows the last picture of the last encoded GOP. Note that prior to receiving the picture, each of the GOP coding modules 138A through 138N may be, for example, free running or may be idle.

Also, the GOP encoding modules 138A through 138N embed timing references in corresponding transport streams. In MPEG coding, these synchronization references include program clock references (PCRs). The master coding control module 139 controls the master GOP coding modules 138A and the slave GOP coding modules 138B through 138N to reference the same PCR. Because each of the encoders 138A through 138N embeds the PCRs in transports streams, the decoder is also a type of slave with respect the same PCR "clock." For instance, the PCR "clock" is a sequential counter used by a decoder operating in a "push model" mode.

In addition, the coding control module 139 controls the GOP encoding modules 138A through 138N to embed the same values of presentation time stamps (PTS) and/or decoder time stamps (DTS). In an example, the same PTS and DTS values may be embedded in a corresponding picture encoded at different bit-rates by the GOP coding modules 138A through 138N. Note that each DTS and/or PTS may not be embedded in every picture. In another example, each DTS and/or each PTS may be embedded in every picture.

Once the GOP coding modules 138A through 138N complete encoding a GOP, the transport rate buffers 144A through 144N receive the encoded-GOP at different bit-rates of the encoders 106A through 106N. In addition, the transport rate control module 145 receives timing information from the coding control module 139 to control the transport rate of the encoded GOP service-set, as will be further described below, by way of additional examples.

By encoding with the same encoding algorithm and by beginning encoding on the same picture of an unencoded GOP, another feature becomes possible. A target ratio of gop_bits to bit-rate is the same for each of the encoders 106A through 106N (within some tolerance). In an example involving the encoders 106A through 106N in which encoding begins on the boundary of a same picture of an unencoded-GOP, each GOP coding module 138A through 138N uses the same encoding algorithm to encode the same received unencoded-GOP. The transport rate control module 145, on a GOP-by-GOP basis, detects the actual time GOP time (referred to as "gop_time") it takes for the GOP coding module 138A to forward the group of pictures at the bit-rate of the encoder 106A. The transport rate control module 145 may detect gop_time as follows:

$$\text{gop\_time} = \frac{\text{GopBits\_100}{percentStream}}{\text{BitRate\_100}{percentStream}} \quad \text{Equation (1)}$$

In an example, the transport rate control module 145 forwards the gop_time of the 100% stream to the lower bit-rate GOP coding modules 138B through 138N. Each GOP coding module 138B through 138N determines a target number of encoded gop_bits. The target number of gop_bits is the number of bits that the encoding algorithm attempts to generate in the encoded GOP.

For instance, if the gop_time of the 100% bit-rate encoder 138A is 1 second, then the target number of gop_bits of the 90% bit-rate encoder is 90% of the gop_bits of the 100% rate encoder. Likewise, the target number of gop_bits of the 80% bit-rate encoder is 80% of the gop_bits of the 100% encoder, and so forth.

Note also that each encoded-GOP may vary in time, due to variable length coding such as H.264. What this means is that each encoded-GOP may vary in length. In one example, an unencoded-GOP having a high level of complexity such as a scene change will tend to generate an encoded-GOP having more gop_bits of greater gop_time, whereas an unencoded-GOP having a low level of complexity such as a still frame video will tend to generate an encoded-GOP of fewer gop_bits having less gop_time.

Because the encoding algorithm may be inexact, the actual encoded gop_bits may vary from the target gop_bits. To compensate, rate control is performed. For example, each GOP coding module 138A through 138N, on a GOP-by-GOP basis, forwards corresponding encoded-GOPs to the transport rate buffers 144A through 144N. For example, each of the transport rate buffers 144A through 144N may forward a value to the transport rate control module 145 that represents the actual number of bits in each corresponding encoded-GOP. Once the transport rate control module 145 receives the value of the actual number of bits, the transport rate control module 145 determines the transport rate for each GOP service-set or GOP-set as follows:

$$GopBitRateLowerRateEncoder = \frac{ActualGopBitsLowerRateStream}{\text{gop\_time}} \quad \text{Equation (2)}$$

Note that the denominator of this equation is the gop_time of the highest bit-rate encoder, for example, the encoder 106A as determined by Equation 1. Also, note that a single GOP encoded at different bit-rates forms an "encoded-GOP-service-set" or an "encoded-GOP-set." An "encoded service-set" or "encoded-GOP-set" is an unencoded-GOP encoded by an encoder-set at multiple different bit-rates. For instance, content from the video source 102A is transmitted via a corresponding channel. Therefore, the combined output of the multi-rate encoder 106A through 106N may be an encoded-GOP-set of the same GOP via the same channel each encoded at different bit-rates. Each of the coding modules 138A through 138N forwards an encoded-GOP-set of different bit-rates to the corresponding transport rate buffers 144A through 144N. Once the transport rate control module 145 determines the actual transport rate of each encoded-GOP for a given encoded-GOP-set, the transport rate control module 145 controls the timing of transmission of the encoded-GOP-set from the transport rate buffers 144A through 144N to the switch 114.

In a sixth scenario, let N=4 for the encoder-set 106A-N and let the encoder 106A encode at a bit-rate of 100%, the encoder 106B encode at a bit-rate of 90%, the encoder 106C encode at a bit-rate of 80%, and the encoder 106D encode at a bit-rate of 70%. In this scenario, the "encoded GOP-set" is a same GOP encoded 1) at a constant bit-rate of 100%, 2) at a bit-rate of 90%, 3) at a bit-rate of 80%, and 4) at a bit-rate of 70%. For instance, content from the video source 102A may be transmitted via a corresponding channel. Therefore, the combined output of the multi-rate encoders 106A through 106N is a "encoded-GOP-set" of the same channel at different bit-rates. This encoded-GOP-set is part of a stream of encoded-GOP-sets of different bit-rates.

Using IP, each encoded-GOP-set is forwarded from the transport rate buffers 144A through 144N to the switch 114 in a manner such that each encoded-GOP of a same encoded-GOP-set begins at the same time and ends at the same time. In other words, each encoded-GOP of a same encoded-GOP-set is received at the same time at the switch 114 shown in FIG. 1A. For this reason, the switch 114 can seamlessly switch between different bit-rate streams of the same channel as may be needed. Each of the coding modules 138A through 138N forwards an encoded-GOP of a corresponding different bit-rate to the corresponding transport rate buffers 144A through 144N. Once the transport rate control module 145 determines the actual transport rate of each encoded-GOP for a given encoded-GOP-set, the transport rate control module 145 controls the timing of transmission of the encoded-GOP-set from the transport rate buffers 144A through 144N to the switch 114.

The transport rate control module 145 may set the rate for each encoded-GOP-stream such that each encoded-GOP-stream should start and end at the same time. If the first encoded-GOP starts at time=0, each transport rate buffer 144A through 144N starts forwarding its encoded-GOP of a same encoded-GOP-set at time=0. Based on the gop_time and GopBitRateLowerRateEncoder, each encoded-GOP of this same encoded-GOP-set also ends transmission at the same time. The next start of an encoded-GOP of a next encoded-GOP-set will be time=0+(current) gop_time. In this regard, the switch 114 needs to wait for the start of a next encoded-GOP of a next encoded-GOP-set for each stream before making the switch on the boundary of an encoded-GOP.

Note that requests for additional channels are processed at the encoding side of the DSL line. When an IPTV subscriber changes or adds a channel as in the above scenarios, the channel is actually remotely switched/selected using a so-called request to join a new multicast group using Internet Protocol Group Membership Version 2 (IGMP). The local office receives the subscriber request, automatically checks to make sure that the subscriber is authorized to view the requested channel and then directs one or more routers in the local office to add that particular subscriber to the distribution list of the requested channel.

Returning to FIG. 1B, if an encoded-GOP (of an encoded-GOP-set) was to arrive at the switch 114 at different times from the time of arrival of the other encoded-GOPs of the same encoded-GOP-set, then an automatic switching among different bit-rates of the same channel may result in a brief interruption of the viewing experience similar to that of from one channel to another channel. This problem, however, is avoided because each encoded-GOP-set is, on an encoded-GOP-set-by-encoded-GOP-set basis, aligned in the transport rate buffers 144A through 144N to be forwarded at the same time according to the control of transport rate control module 145. In addition, on an encoded-GOP-set-by-encoded-GOP-set basis, the switch 114 receives the beginning of each encoded-GOP of a same encoded-GOP-set at the same time and receives the end of each encoded-GOP of the same encoded GOP-set at the same time. Note IP jitter may interfere with a perfect scenario in this regard. However, IP jitter, for example, may be accommodated by the design of the switch 114. The switch 114 switches among different bit-rates of the same channel on the boundary of an encoded-GOP-set. For instance, the first picture in an encoded-GOP may be the MPEG image frame or I frame. A switch from one bit-rate to another bit-rate of the same channel occurs immediately after a last encoded-GOP. In addition, because such a switch occurs on the I frame of a current encoded-GOP, the switch 114 seamlessly switches so that there is no glitch in viewing experience.

The video buffer verifier (VBV) is a mechanism by which an encoder and a corresponding decoder avoid overflow and/or underflow in video buffer of the decoder. For example, H.264 specifies a 30 Mbit buffer at level 4.0 in the decoder of an HD channel. In addition, the encoder keeps a running track of the amount of video data that it forwards to the decoder. If the VBV is improperly managed, the video buffer of the decoder could underflow that means run out of video to display. In this scenario, the viewing experience involves dead time. In addition, the VBV may overflow meaning that the decoder buffer cannot hold all of the data it receives. In this scenario, the excess data is dumped and the viewing experience is similar to an instant fast-forwarding similar to jumping forward in the video. Both scenarios are disruptive to the viewing experience. Note also that both video underflow and overflow cause video corruption. Video corruption can persist for the entire GOP since subsequent frames in that GOP use the past anchor frames (I and P) as reference. Data loss can produce video corruption.

Because each encoded-GOP-set of a channel arrives at the decoder at substantially the same time, and because the sync references (for example, PCRs, PTSs, DTSs) of the same channel are forwarded by all encoders of a given channel to the decoder, each I-frame of the channel arrives at the decoder before the DTS, regardless of the bit-rate. Therefore no VBV underflow will occur.

VBV overflow is also avoided even in extreme cases. For instance, a combination of a high bit-rate, long system delay, and low AVC level (advanced video coding level), that may otherwise result overflow, is avoided. In this regard, the GOP coding modules 138B through 138N (of slave encoders 106B through 106N) protect against VBV overflow. These coding modules track buffer levels to determine VBV fullness. However, as a decoder receives video immediately following a switch from a higher bit-rate to a lower bit-rate, the actual VBV fullness will be larger than the VBV fullness value that had been calculated by the lower bit-rate encoder. In this, the worse case scenario is the difference between VBV fullness values computed by the 100% bit-rate encoder and the lowest bit-rate encoder of any given channel. Here, the VBV delay is equal to the system delay. At this point, when the decoder buffer is large enough to handle the worse case scenario, the decoder buffer is at its fullest level and is equal to the bit-rate multiplied by the system delay. This difference, or offset, between the actual VBV fullness and the VBV fullness value of encoder(n), is computed as:

$$\text{VBVFullnessOffset}(n) = \text{sysDelay} * (\text{bitRate\_100percentStream} - \text{bitRateEnc}(n)) \quad \text{Equation (3)}$$

As an example, each of the lower-rate GOP coding modules 138B through 138N of the encoder-set 106 determines a VBVFullnessOffset, subtracts this offset from the decoder buffer available size it would otherwise compute, and uses this result as an adjusted buffer available size. In this, the GOP coding modules 138B through 138N use the adjusted buffer available size for buffer protection and therefore VBV overflow is avoided. For AVC, this will typically have no effect on the rate control since the decoder buffer is much larger than is needed.

In a seventh scenario, a 10 Mbps stream has a 1-second system delay. The maximum decoder buffer fullness is 10

Mbps*1 sec=10 Mbits. For AVC at level 4.0 (for HD), the decoder buffer is 30 Mbits, so the VBV cannot overflow. VBVFullnessOffset at a 70% bit-rate is 10 Mbps*(1−0.7)*1.0 sec=3 Mbits. Therefore, this offset is small and has little to no effect on rate control.

Considering an eighth scenario having similar conditions as the seventh scenario except the standard is MPEG-2 or ATSC instead of AVC. A stream of 10 Mbps having a 1.0 second system delay will be coded to limit the decoder buffer level to the buffer size because the buffer size is about 9 Mbits for MPEG-2 and 8 Mbits for ATSC. Unprotected, a system delay greater than 0.9 seconds can result in overflow for MPEG-2 (10 Mbps*0.9 sec=9 Mbits). In addition, a system delay greater than 0.8 seconds can result in overflow for ATSC (10 Mbps*0.8 sec=8 Mbits). For this case, the VBV-FullnessOffset at a 70% bit-rate is still 3 Mbits to protect the VBV buffer from overflow.

Considering a ninth scenario with a 7.5 Mbps stream having a 1.0 second system delay. The maximum decoder buffer fullness is 7.5 Mbits (7.5 Mbps*1.0 sec=7.5 Mbits). Here VBVFullnessOffset at a 70% bit-rate is 2.25 Mbits (1.0*(7.5 Mbps−(7.5 Mbps*0.7))=2.25 Mbits.) Thus, switching from the 100% stream to the 70% stream, the 70% stream encoder computes the VBV size as 5.25 Mbits (1 sec*7.5 Mbps*0.7=5.25 Mbits). However, prior to decoding the switch point, the true VBV size is 7.5 Mbits (5.25 Mbits+2.25 Mbits=7.5 Mbits). Therefore, the 70% stream encoder must use the 7.5 Mbits value as buffer fullness when computing picture sizes in order to prevent overflow. If the VBV maximum buffer size is 8.0 Mbits, at the switch point, the 70% stream encoder has only 0.5 Mbits available of VBV buffer (8 Mbits−7.5 Mbits=0.5 Mbits). Without considering the switch point, the 70% stream encoder would have computed the available VBV buffer level as 2.75 Mbits (8.0 Mbits−5.25 Mbits=2.75 Mbits).

Smaller decoder buffers and longer system delays may require lower bit-rates. Put differently, higher bit-rates and longer system delays may require larger decoder buffers to avoid overflow.

FIG. 1C shows a multi-rate encoder 100 according to another embodiment. The multi-rate encoder shown in FIG. 1C is similar to the multi-rate encoder shown in FIG. 1B, except rate control is accomplished in the embodiment of FIG. 1C using preprocessing and/or multi-pass encoding instead of using the transport rate control of FIG. 1A (via the transport rate control buffers 144A through 144N and the transport rate control module 145). By using preprocessing and/or multi-pass encoding, the actual number of bits in an encoded-GOP may more closely match the target number of bits in an encoded-GOP not using preprocessing and/or multi-pass encoding.

FIG. 1C shows modules and hardware for encoders in an encoder-set according to an embodiment. The encoders may be used for any of the encoder-sets 106A-N through NA-N as described in the embodiment of FIGS. 1A, 1B and 1D.

Similar to the embodiment of FIG. 1B, the encoder 106A in the embodiment of FIG. 1C is a master encoder and the encoders 106B through 106N in the embodiment of FIG. 1C are slave encoders. Similar to the embodiment of FIG. 1B, the encoder 106A and the encoder 106N in the embodiment of FIG. 1C are shown whereas the encoders 106B through 106N−1 are not shown. Although the encoders 106B through 106N−1 are not shown, the encoders 106B through 106N−1 include similar features as shown for encoder 106N.

Also, the alignment modules 148A through 148N in the embodiment of FIG. 1C operate in a similar manner to the above-disclosed alignment modules 136A through 136N in the embodiment of FIG. 1B; except the control 154 in the embodiment of FIG. 1C may perform the functions of the alignment control module 143 in the embodiment of FIG. 1B.

Differently than the embodiment of FIG. 1B, the embodiment of FIG. 1C includes a plurality of GOP coding modules 150A through 150N, the control 154, a gop_time detector 152, and a plurality of encoder buffers 156A through 156N. Rate control in the embodiment of FIG. 1C is accomplished by 1) aligning unencoded-GOPs at the input of the GOP coding modules 150A through 150N so as to encode GOPs at the start of a same picture on the boundary of that same picture; 2) preprocessing these aligned unencoded-GOPs in coding modules 150A through 150N; and/or 3) multi-pass encoding these aligned GOPs by coding modules 150A through 150N.

The control 154 (of the master encoder 106A) controls the GOP coding modules 150A (of the master encoder 106A) as well as the GOP coding modules 150B through 150N (of the slave encoders 106B through 106N). The GOP coding modules 150A through 150N encode a same group of pictures beginning on the same boundary of the same picture at the same time, for example, as described in the examples herein in the embodiment of FIGS. 1A and 1B. Furthermore, the control 154 generates synchronization references and performs similar functions as the coding control module 139 in the embodiment of FIG. 1B.

The GOP time detector module 152, on a GOP-by-GOP basis, detects the actual time (gop_time) it takes for the GOP coding module 150A to forward the group of pictures. In this, the GOP time detector module 152 detects gop_time pursuant to the above-described Equation (1).

The GOP coding modules 150A through 150N each receive an aligned unencoded-GOP at the same time. In addition, on a GOP-by-GOP basis, each coding module generates multiple streams of encoded-GOPs of different bit-rates to form an encoded-GOP-set. Rate control is accomplished on a GOP-by-GOP basis when the ratio of the number of bits in an encoded-GOP divided by the bit-rate of the encoder is the same for the encoded-GOP generated by each encoder of a corresponding encoder-set.

Preprocessing may be used to accomplish rate control, such as in the embodiment of FIG. 1C. In this, the GOP coding modules 150A through 150N may control preprocessing. Preprocessing involves analyzing unencoded-GOPs before encoding. For example, the content of a picture can be analyzed for complexity and variance of complexity within a picture. Here, the purpose of preprocessing is to better estimate a bit-budget of encoded GOP bits. The closer the number of bits budgeted to the actual number of encoded GOP bits, the closer the match of GOPs generated from GOP coding modules 150A through 150N with regard to the ratio of number of encoded GOP bits divided by the bit-rate of the encoder.

Multi-pass encoding may also be used to accomplish rate control. For example, in the embodiment of FIG. 1C, the GOP coding modules 150A through 150N may control multi-pass encoding, alone, or in combination with preprocessing. Optionally, each of the GOP coding modules 150A through 150N may use a different encoding algorithm. However, in this example, the same encoding algorithm is used by each of the GOP coding modules 150A through 150N. In addition, because the encoding algorithm may be inexact, the actual encoded gop_bits may slightly vary from the target gop_bits. To compensate, iterative multipass encoding may be performed. Iterative multi-pass encoding may improve the degree in which the actual number of encoded bits matches the target number of encoded bits. The closer the match of actual number of encoded bits to target number of encoded bits among the output of GOP coding modules 150A through 150N, the closer the target ratio of number of encoded GOP bits divided by the bit-rate of the encoder. In this, the better the rate control.

The encoder buffers 150A through 150N receive the encoded GOP service-set of different bit-rates from corresponding GOP coding modules 150A through 150N.

As described above, the embodiment of FIG. 1C accomplishes rate control by preprocessing, alone, multi-pass encoding alone or preprocessing in combination with multi-pass encoding. The closer the ratio of the actual number of bits to encoder bit-rate across the output of the GOP coding modules 150A through 150N, the closer each encoded-GOP-set will arrive at the switch 114 at the same time. Switching among different bit-rates of the same encoded-GOP-set, on the boundary of corresponding encoded GOPs of the same encoded-GOP-set, results in seamless switching and thus an uninterrupted viewing experience otherwise attributable to glitching caused by not switching on the boundary of a GOP.

The multi-rate encoders described in FIGS. 1A-C include encoder-sets operable to receive a same video source stream and forward multiple encoded streams of the same video source stream at different bit-rates. In this example, the video streams from the sources 102A-N may include raw video in display order. However, as an option, the video streams from the sources 102A-N may be encoded video data. In this, the first encoder in the encoder-set 106, such as the encoder 106A shown in FIGS. 1B and 1C, may be a pass-through for the encoded video data in the received encoded video stream, and the encoders 106B-N may be transraters that generate the encoded stream at different bit-rates.

FIG. 1D shows a simplified block diagram of a multi-rate statistical multiplexing system 170 configured to perform various functions described, according to an embodiment of the invention.

The multi-rate statistical multiplexing system 170 may include additional components and some of the components described herein may be removed and/or modified without departing from the functionality of the multi-rate statistical multiplexing system 170.

However, it should be understood that the multi-rate statistical multiplexing system 170 may include additional components and that some of the components described herein may be removed and/or modified without departing from the functionality of the multi-rate statistical multiplexing system 170.

The multi-rate statistical switching system 170 includes a multi-rate encoder 172, encoder-sets 176 through 180, multi-rate statistical switch controllers 187A and 187N, and switches 188 and 189A through 189N, Subscriber A, and CPE of Subscriber and Subscriber N. The CPE of Subscriber A includes HD DVR 181, STB 182A and 182B, HDTV 183, SD DVR 184, and SDTV 186.

The operation of the multi-rate encoder 172 is similar to the above-described operation of the multi-rate encoder 101 in the embodiment of FIG. 1A and may include the features described in the embodiments of FIGS. 1B, 1C, 2, 3A, 3B and 3C. For example, the encoder-sets 176, 178 and 180 are configured to have similar features to the encoder-sets 106, 108 and 110 as described in the embodiments of FIGS. 1A, 1B, 1C, 2, 3A, 3B and 3C. Similarities between these correspond to similar features. However, it should be clear that the embodiment of FIG. 1D is not limited to these other embodiments.

Not shown is additional encoder-sets. However, the multi-rate encoder 172 may have additional encoder sets having similar features as those described herein with respect to the encoder-sets 176, 178 and 180, or any combination. Not shown is Subscribers B through N-1. In addition, CPE is not shown for the Subscribers B through N. However, each of these subscribers may have similar features as those described herein with respect to the Subscriber A and the CPE of Subscriber A, or any combination thereof. Not shown are switches 189B through 189N-1. However, each of these switches may have similar features as those described herein with respect to the switch 189A. Not shown are multi-rate statistical switch controllers 187B through 187N-1. However, each of these switch controllers may have similar features as those described herein with respect to the switch controllers 187.

Three channels respectively from the video sources 174A, 174B and 174C are described herein for the purposes of describing features of the multi-rate statistical switching system 170. However, it should be recognized that the switches 188 and 189A through 189N may receive any number of channels. In addition, by way of example, the switches 189A through 189N are located at the edge of the above-described last mile and the switch 188 is located prior to the edge of the last mile.

The multi-rate encoder 172 receives each version of each channel, 174A, 174B and 174C. In this, the encoder-set 176 receives video content from the video source 174A, the encoder-set 178 receives video content form the video source 174B and the encoder-set 180 receives video content from the video source 174C, and so forth.

Each of the encoder-sets 176, 178 and 180 encodes the corresponding received video content 174A, 174B and 174C into corresponding multiple different versions of the same channels, each version encoded at a different bit-rate. For instance, each version of a channel has the same content encoded at different bit-rates. For example, a channel includes video content from a particular video source, such as the video source 174A. The encoder 176A, at a first bit-rate, encodes the video content from video source 174A. The encoder 176B encodes the same video content from the same video source 174A at a second or different bit-rate lower than the bit-rate of the encoder 176A. Similarly, the encoder 176C encodes the same video content at a third different bit-rate lower than the bit-rate of the encoder 176B, and so forth. It is noted that each encoder-set in the embodiments described throughout this disclosure may encoder and varying different bit-rates and that the encoder-rates described herein are only examples (100%, 90%, 80% and 70%).

The multi-rate statistical switch controller 187A controls the switch 189A to forward one version of each channel requested on the subscriber-line of Subscriber A. In the situation of a congested-state of the subscriber-line (between the switch 189A and the premises of Subscriber A), the switch controller 187A decides which bit-rate version of each requested channel to forward to the Subscriber A. The multi-rate statistical switch controller 187A receives meta-data for each encoded-GOP-set. For example, on an encoded-GOP-set-by-encoded-GOP-set basis, the meta-data embedded in an encoded-GOP-set includes an indicator of perceived quality of viewing experience of the encoded-GOP-set. In a first example, each encoded-GOP, in an encoded-GOP-set, includes an indicator of perceived quality of viewing experience of the encoded-GOP-set. In second example, only one encoded-GOP of an encoded-GOP-set will include an indicator of perceived quality of viewing experience for the entire encoded-GOP-set. For instance, the perceived quality of viewing experience of each encoded-GOP-set may be determined from one of the encoded-GOPs of the same encoded- GOP-set due to, for example, the proportional relationship between each encoded-GOP with respect to each other encoded-GOP in a same encoded-GOP-set, as described herein. In a third example, the bit-rate of each encoded-GOP-set is hard-coded meaning that the bit-rate is implicitly known. However, as an option, any combination of one or more indicators of bit-rate may be embedded in one or more encoded GOPs of any encoded-GOP-set. Alternatively or in addition, any one or more values of bit-rate itself may be similarly embedded. An identifier of each version may be similarly embedded. However, one having ordinary skill in the art will recognize that the perceived quality of viewing experience (i.e., any combination of one or more indicators of perceived quality) as well as bit-rate (i.e., any combination of one or more indicators and/or values of bit-rate itself, and identifiers of channel version may be embedded differently without departing from the scope of the present invention.

The multi-rate statistical switch controller 187A receives congestion information, timing information, and bit-rate information. For example, the timing information of an encoded-GOP-set may be embedded into that encoded-GOP-set by the encoder-set that generated that encoded-GOP-set. Regarding the congestion information, the multi-rate statistical switch controller 187A may monitor the Subscribers A-N and thereby obtain congestion information for each subscriber-line to determine congestion information on a subscriber-per-subscriber basis. For example, the switch multi-rate statistical switch controller 187A determines on a subscriber-per-subscriber basis whether the corresponding subscriber-line (for instance, the subscriber-line between the switch 189A and the Subscriber A) is or is not in a congested-state. A congested-state is a scenario in which a subscriber requests more bandwidth in total than can be sent through the last-mile of the subscriber-line, as described herein. In addition, the multi-rate statistical switch controller 187A uses a determined level of congestion, the bit-rate of each encoded-GOP of each encoded-GOP-set of each channel, an indicator of perceived quality of viewing experience, and timing information to select which version of each subscriber-requested channel to forward to each subscriber.

The switch 188 receives each version of different bit-rates of each channel. For example, the switch 188 receives content from each of the video sources 174A, 174B and 174C. The switch 188 forwards each version of each to the switch 189A that located on or near the edge of the last mile.

The switch 189A receives each version of each channel requested by each subscriber. In addition, for example, in response to a schedule and corresponding control signaling from the switch controller 187A, the switch 189A forwards one version of each requested channel to each subscriber. For instance, for each subscriber-line, the multi-rate statistical switch controller 187A controls the switch 189A to forward each requested channel at the best available bit-rate subject to any one or more predetermined criteria, a corresponding level of congestion, bit-rate of each requested channel, and one or more indicators of a perceived quality of viewing experience. The multi-rate statistical switch controller 187A controls the switch 189A to forward a version of each channel requested by each subscriber. In selecting which version of each requested channel to forward, the multi-rate statistical switch controller 187A selects a version to maintain a perceived quality of viewing experience. In this, the multi-rate statistical switch controller 187A is configured to operate continuously, switching at next available switching opportunities to repeatedly balance a level of congestion of each subscriber-line, the bit-rate of each channel requested by the subscriber of each subscriber-line, and one or more indicators of quality of each channel requested by each subscriber. In addition, the multi-rate statistical switch controller 187A uses synchronization information or timing information, as described herein, to control the timing of switches among different versions of each requested channel.

For example, the embodiments described in FIGS. 1A-C, 2 and 3A-B describe switching among different versions of a same channel in a manner that avoids glitches in subscriber viewing experience wherein each version of a same channel may be synchronously switched. However, because each channel is asynchronous with respect to each other channel, the multi-rate statistical switch controller 187A is configured to switch at next switching opportunities that are not coincident in time from channel to channel. For example, using AVC coding, a variable length encoded-GOP of a first channel requested by a subscriber will likely have a different length than the variable length encoded-GOP of a second channel (requested by the same subscriber). In a scenario involving switching among different versions of these two channels, the next switching opportunity of the first channel is different from the next switching opportunity of the second channel. For instance, the next switching opportunity of the first channel is on the boundary of a variable-length encoded-GOP of the first channel and the next switching opportunity of the second channel is on the boundary of a variable length encoded-GOP of the second channel. Because the variable length of the first and second channels' encoded-GOPs are of different lengths, the next switching opportunity of each channel is not coincident. In this, the multi-rate statistical switch controller 187A controls the switch 189A to switch at the next switching opportunity of each channel and therefore controls the switch 187A to switch asynchronously with respect to each other.

Consider a first switching event between two different versions of the same content from the video source 174A. For example, the encoder 176A encodes the video content from the video source 174A. A viewer on the premises of Subscriber A views this video content at a bit-rate of 100%. The encoder 176B encodes the same video content at a lower bit-rate of 90%. Before a first switching event, the viewer enjoys a perceived quality of viewing experience corresponding to a bit-rate of 100%. However, due to congestion on the subscriber-line of the Subscriber A, the multi-rate statistical switching system 170 controls the switch 189A to switch seamlessly as described herein. For example, the multi-rate statistical switching system 170 controls the switch 189A to switch at a next switching opportunity from the 100% version to the 90% version. However, the viewer does not perceive a change in quality of viewing experience. This, even though the viewer is viewing a different lower bit-rate version of the same channel. Here, one or more indicators of a perceived quality of viewing experience embedded in the channel indicated a higher level of perceived viewing experience in the 90% bit-rate encoded stream due to, for example, video content of lower complexity. In this, the multi-rate statistical switch controller 187A balances the level of congestion of this channel with other channels requested on the subscriber-line, including one or more indicators of perceived quality of viewing experience of each version of each channel requested by each subscriber and corresponding bit-rates of each version of each channel requested by each subscriber, to determine that a perceived level of viewing experience can be maintained on the channel even at the lower bit-rate of 90%.

Figure 1E:
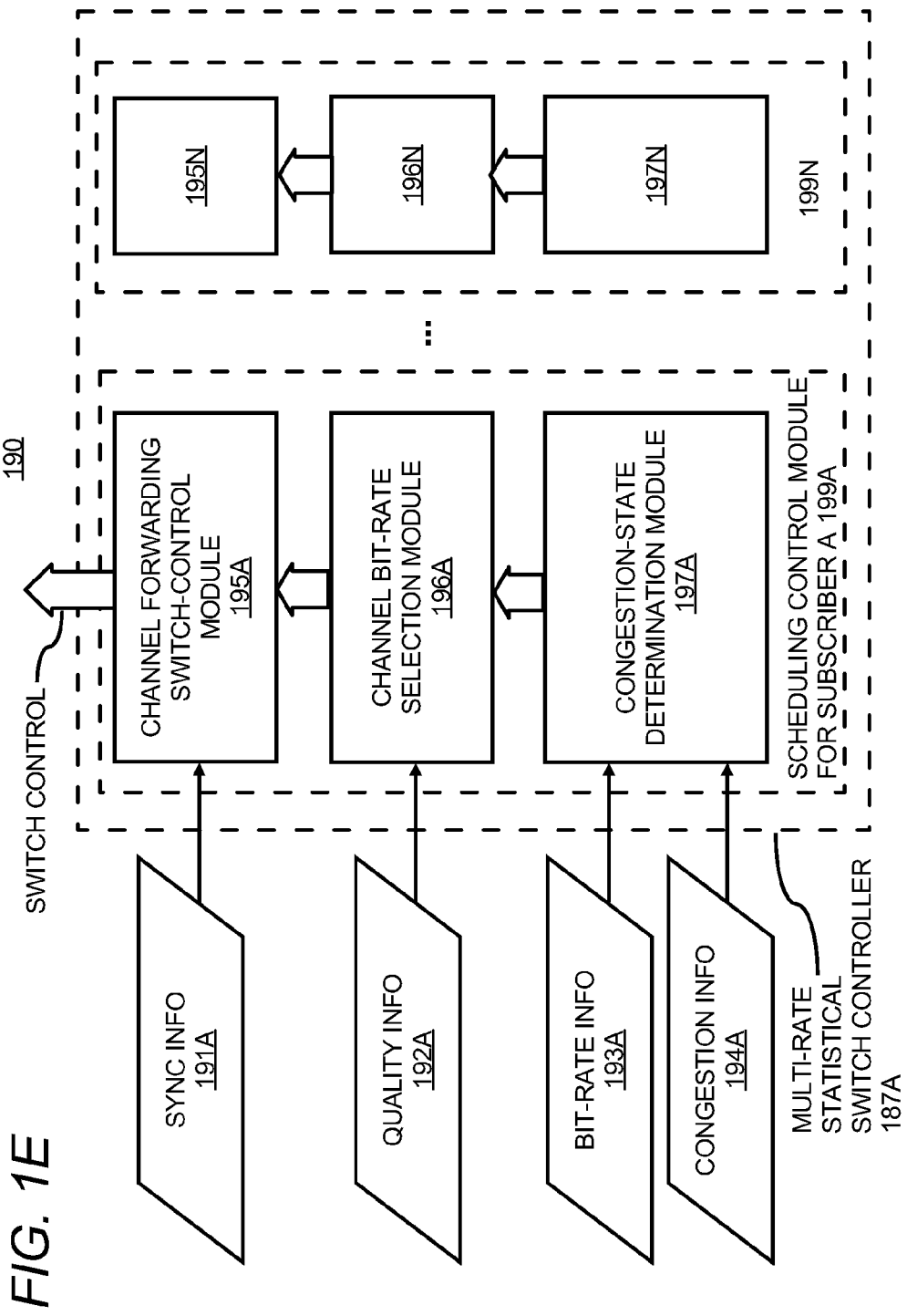
FIG. 1E shows a simplified bock diagram of a multi-rate statistical switch controller configured to perform various functions described herein and operable to maintain a perceived quality of viewing after switching events, according to an embodiment of the invention.

FIG. 1E shows a simplified bock diagram of the multi-rate statistical switch controller 187A. On a subscriber-line-per-subscriber-line basis, FIG. 1E is operable to dynamically balance available bandwidth, one or more indicators of a perceived quality of viewing experience of each channel requested by each subscriber; as well as to perform various functions described herein, according to embodiment of the invention.

The multi-rate statistical switch controller 187A includes a channel forwarding switch-control module 195A, a channel bit-rate selection module 196A and a congestion-state determination module 197A. The channel forwarding switch-control module 195A obtains sync info 191A. The channel bit-rate selection module 196A obtains quality info 192A. In addition, the congestion-state determination module 197A obtains bit-rate info 193A and congestion info 194A. Not described in detail are corresponding features for the scheduling control modules for the Subscribers A through N. However, it should be clear that the scheduling control modules for the Subscribers A through N may have similar features as described herein for the scheduling control module 199A for Subscribers A.

The multi-rate statistical switch controller 187A may include additional components and some of the components described herein may be removed and/or modified without departing from the functionality of the switch controller 187A. In addition, the multi-rate statistical switch controllers 187B-N are similar to the multi-rate statistical switch controller 187A.

For example, the multi-rate statistical switch controller 187A is configured to operate similarly as the multi-rate statistical switch controller 187A described in the embodiment of FIG. 1D. The multi-rate statistical switch controller 187A includes a scheduling control module for Subscriber A 199A. Not shown in detail, the multi-rate statistical switch controller 187A includes scheduling control modules for Subscriber B through N respectively designated as 199B through 199N. However, it should be clear that these control modules may include similar features as those described herein with respect to the scheduling control module for Subscriber A 199A.

The congestion-state determination module 197A obtains bit-rate information 193A for each channel requested by the Subscriber A. As described herein, the bit-rate of each encoded-GOP-set is hard-coded meaning that the bit-rate is implicitly known. However, as an option, any combination of one or more indicators of bit-rate may be embedded as metadata in one or more encoded GOPs of any encoded-GOP-set. Alternatively or in addition, a value (of bit-rate itself) may be similarly embedded. An identifier of each channel version may also be similarly embedded. For example, the congestion-state determination module 197A obtains the bit-rate information 193A from each encoded-GOP-set of each channel requested by the Subscriber A. By way of further example, the bit-rate information 193A as described herein may be embedded separately or together with the quality information 192A. For example, the bit-rate information 193A may be embedded in each encoded-GOP-set as described herein. One of ordinary skill in the art, however, will recognize that the bit-rate information 193A is not necessarily embedded in each encoded-GOP-set of each channel and therefore that some encoded-GOP-sets may not include the bit-rate information 193A. In this, one having ordinary skill in the art will recognize that the bit-rate information 193A may be embedded differently without departing from the scope of the present invention. In addition, the congestion-state determination module 197A obtains congestion information 194A of the subscriber-line of Subscriber A. From the bit-rate information 193A and the congestion information 194A, the congestion-state determination module 197A determines whether the Subscriber A is in a congested-state by, for example, comparing the bandwidth in total requested by the Subscriber A against the bandwidth in total available on the subscriber-line of Subscriber A.

The channel bit-rate selection module 196A obtains quality information for each channel requested by the Subscriber A. As an example, the multi-rate statistical switch controller 187A receives meta-data for each encoded-GOP-set. For example, on an encoded-GOP-set-by-encoded-GOP-set basis, the meta-data embedded in an encoded-GOP-set includes an indicator of perceived quality of viewing experience of the encoded-GOP-set. In a first example, each encoded-GOP, in an encoded-GOP-set, includes any combination of one or more indicators of perceived quality of viewing experience of the encoded-GOP-set. In a second example, only one encoded-GOP of an encoded-GOP-set will include an indicator of perceived quality of viewing experience for the entire encoded-GOP-set. For instance, the perceived quality of viewing experience of each encoded-GOP-set may be determined from one of the encoded-GOPs of the same encoded-GOP-set due to, for example, the proportional relationship between each encoded-GOP with respect to each other encoded-GOP in a same encoded-GOP-set, as described herein. One having ordinary skill in the art, however, will recognize that the quality information 192A may be embedded differently without departing from the scope of the present invention. For example, upon obtaining the quality information 192A from each encoded-GOP-set of each channel requested by the Subscriber A, the channel bit-rate selection module 196A is operable to balance the bandwidth of all channels requested by the Subscriber A against the level of complexity of each channel requested by the Subscriber A (as indicated by the quality information 192A of each channel), a level of congestion of the subscriber-line of Subscriber A, as well as the bit-rate of each channel requested by the Subscriber A to determine which version of each channel to forward to the Subscriber A in a manner which leverages the available bandwidth by switching to lower bit-rate versions of each requested channel when the perceived quality of viewing experience may not be noticed.

Figure 2:
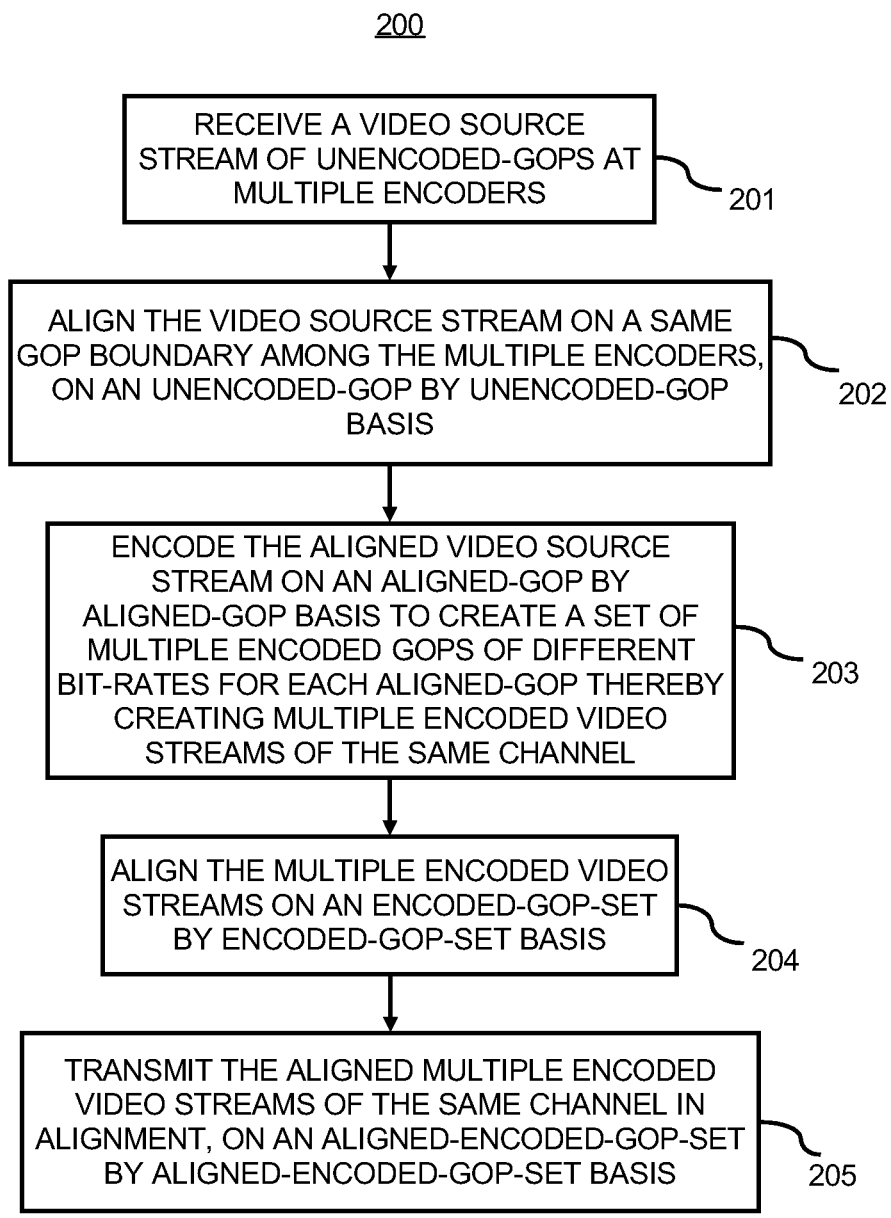
FIG. 2 illustrates a flow diagram of a method for aligning GOPs and rate control by transport rate buffering to maintain a perceived quality of viewing during switching events, according to an embodiment of the invention.
Figure 3A:
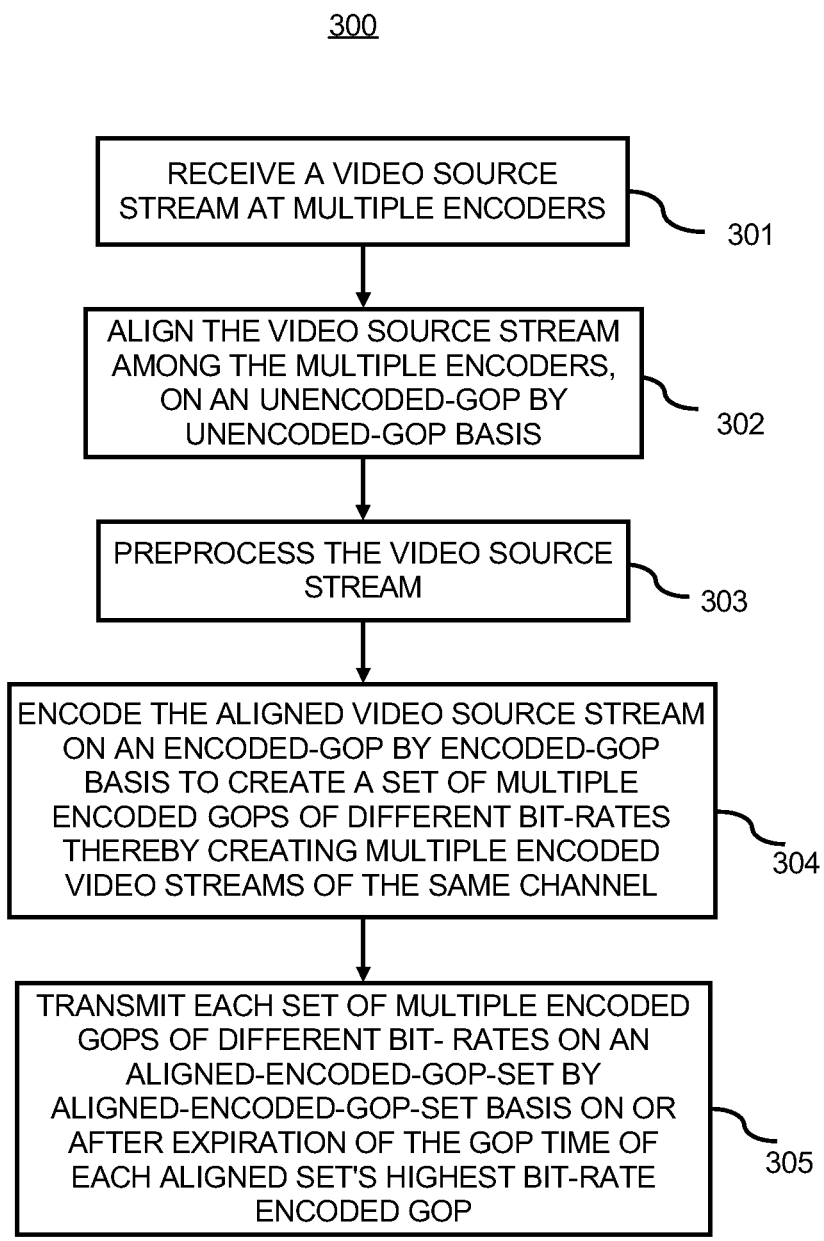
FIG. 3A illustrates a flow diagram of a method for aligning GOPs and rate control by preprocessing to maintain a perceived quality of viewing during switching events, according to an embodiment of the invention.
Figure 3B:
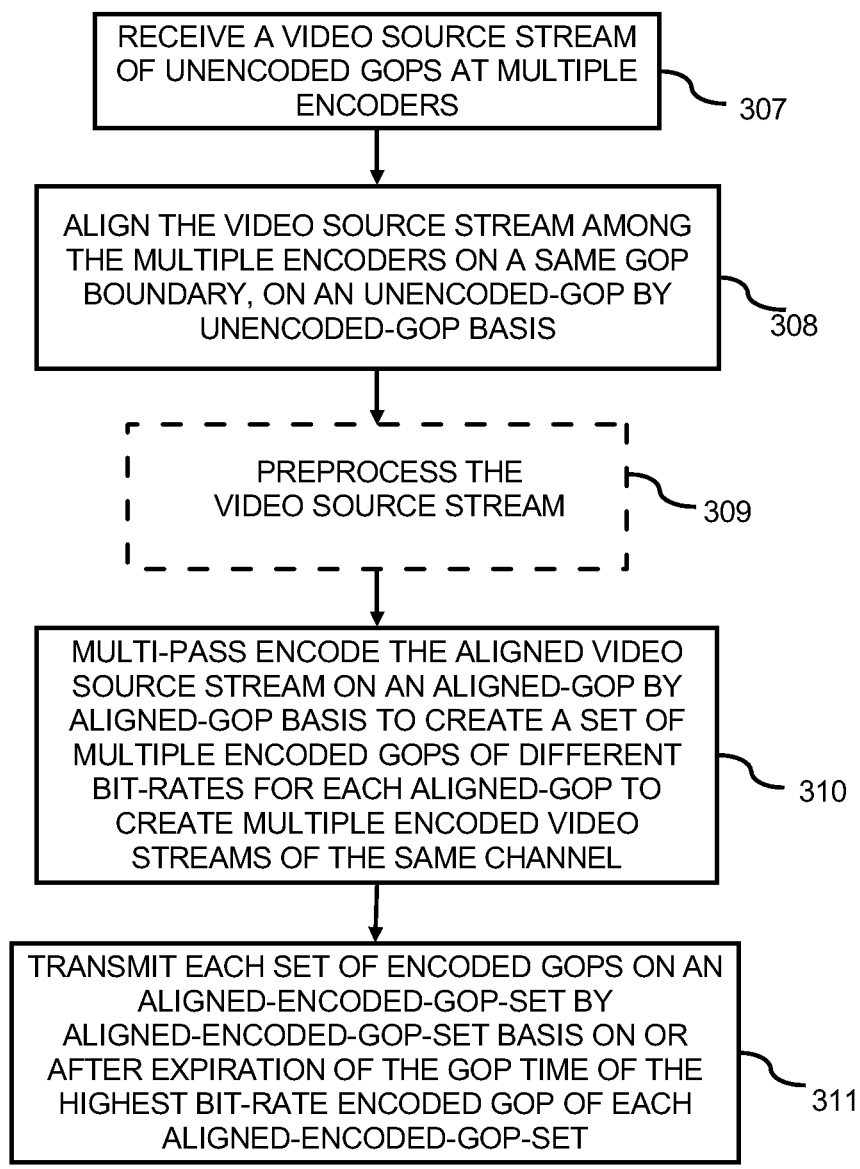
FIG. 3B illustrates a flow diagram of a method for aligning GOPs and rate control by multi-pass coding to maintain a perceived quality of viewing during switching events, according to an embodiment of the invention.

The channel forwarding switch-control module 195A is operable to obtain timing or synchronization information, which has been embedded in each channel, as described by way of example in the embodiments of FIGS. 1A, 1B and 1C as well as the embodiments of FIGS. 2, 3A and 3B. The channel forwarding switch-control module 195A controls the switch 187A, as needed, to switch between the different bit-rates of each requested channel. In this, the multi-rate statistical switch controller 187A acts to maintain a quality of viewing experience of each requested channel by leveraging bandwidth that may be made available due to pictures having lower levels of complexity. For example, the channel bit-rate selection module 196A may select a lower bit-rate for the channel having content from the video source 174A. For instance, the channel having content from the video source 174A may have a quality metric indicating a lower level of complexity embedded therein thereby indicating that switching to a lower-bit-rate version of the same channel may result in little to no change in perceived quality of viewing experience. In this, the bandwidth made available by switching to the lower bit-rate may be allocated to accommodate content of higher complexity on the channel from the video source 174B having one or more metric indicating a higher level of complexity embedded therein.

The above-described embodiments of FIGS. 1A through 1E are example systems configured, for example, to maintain a quality of viewing experience during a first switching event. For example, the embodiments of FIGS. 1A-1C describe example systems to avoid glitching during this first switching event. As another example, the embodiments of FIGS. 1D and 1E are systems configured, for example, to maintain a perceived quality of viewing experience from the time preceding a switching event to the time following the switching event. For example, the embodiments of FIGS. 1D and 1E include examples of a system configured to maintain a viewer's perception of quality of viewing experience even though, for example, the system switches from a higher bit-rate of a channel to a lower bit-rate of the same channel.

Examples of methods in which the multi-rate encoder 101 may be employed to encode video data will now be described with respect to the following flow diagrams of the methods 200, 300 and 306 depicted in FIGS. 1A, 1B, 1C and 2. In addition, an example in which the multi-rate statistical switch controller 187A may be employed will be described further below with respect to the flow diagram of the method 312 in the description of the embodiment of FIG. 3C.

The descriptions of the methods 200, 300 and 306 are made with reference to the multi-rate encoder 101 shown in FIGS. 1A, 1B, and 1C, and thus make reference to the elements cited therein. Similarly, the description of the method 312 is made with reference to the multi-rate statistical switch controller 187A shown in FIGS. 1D and 1E. However, it should be understood that the methods 200, 300 and 306 are not limited to the elements set forth in the multi-rate encoder 101. In addition, it should be understood that the method 312 is not limited to the elements set forth in the multi-rate statistical switch controller 187A. Instead, it should be understood that the methods 200, 300 and 306 may be practiced by a multi-rate encoder having a different configuration than that set forth in the multi-rate encoder 101. Similarly, it should be understood that the method 312 may be practiced by a multi-rate statistical switch controller having a different configuration than that set forth in the multi-rate statistical switch controller 187A.

Some or all of the operations set forth in the methods 200, 300, 306 and 312 may be contained as utilities, programs or subprograms, in any desired computer accessible medium. In addition, the methods 200, 300, 306 and 312 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices. Also, note that modules described above may be hardware only, software only, or a combination of hardware and software. Exemplary computer readable storage devices include conventional computer system RAM, ROM, EPROM, EEPROM and magnetic or optical disks or tapes.

Figure 4:
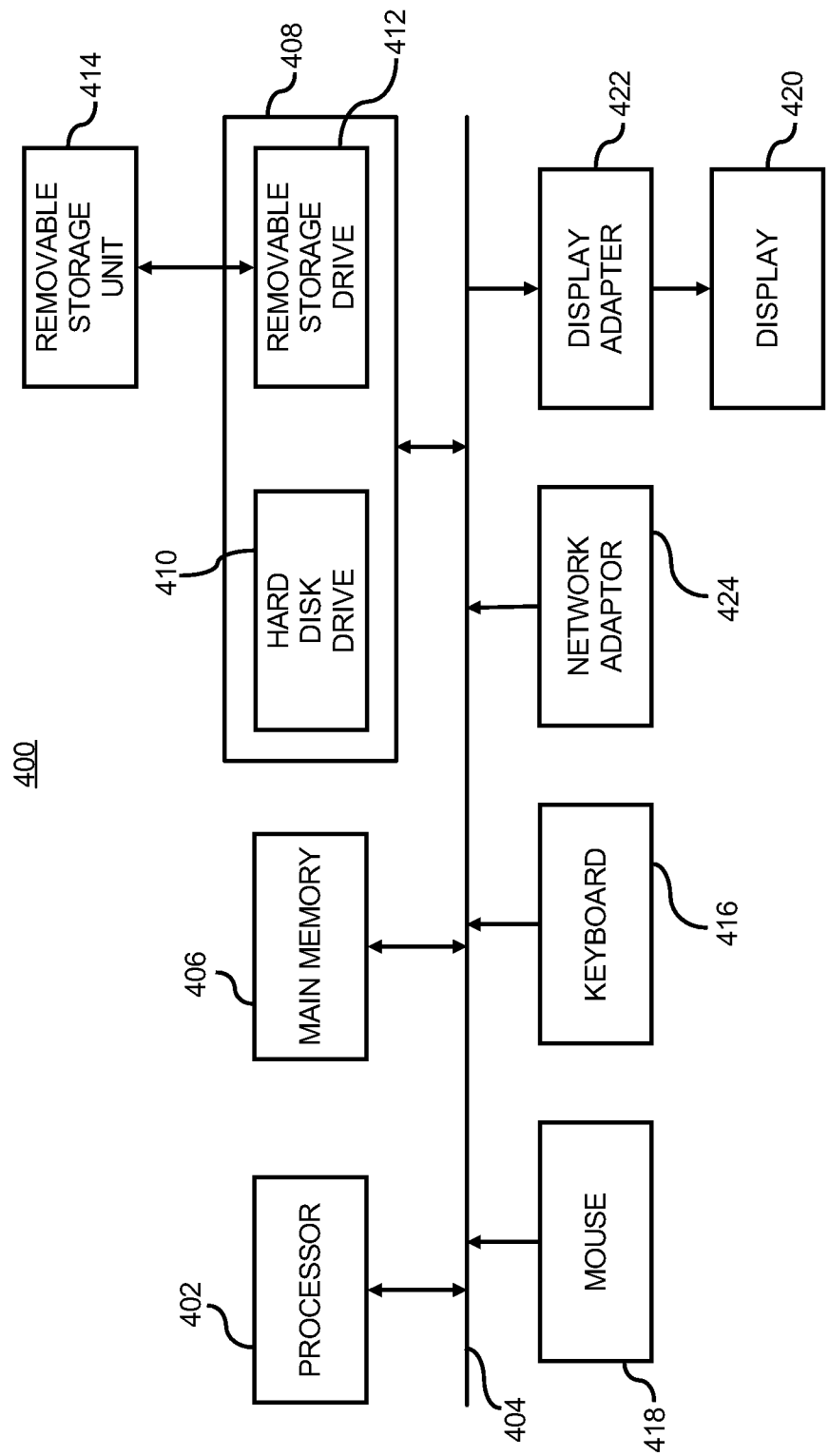
FIG. 4 shows a block diagram of a computing apparatus configured to implement or execute the methods illustrated in FIGS. 2, 3A, 3B and 3C, according to an embodiment of the invention.

A controller, such as a processor (for example, as shown in FIG. 4), ASIC, microcontroller, etc., may implement or execute the multi-rate encoder 101 to perform one or more of all three of the methods 200, 300, 306. Alternatively, the multi-rate encoder 101 may be configured to operate independently of any other processor or computer device.

Figure 3C:
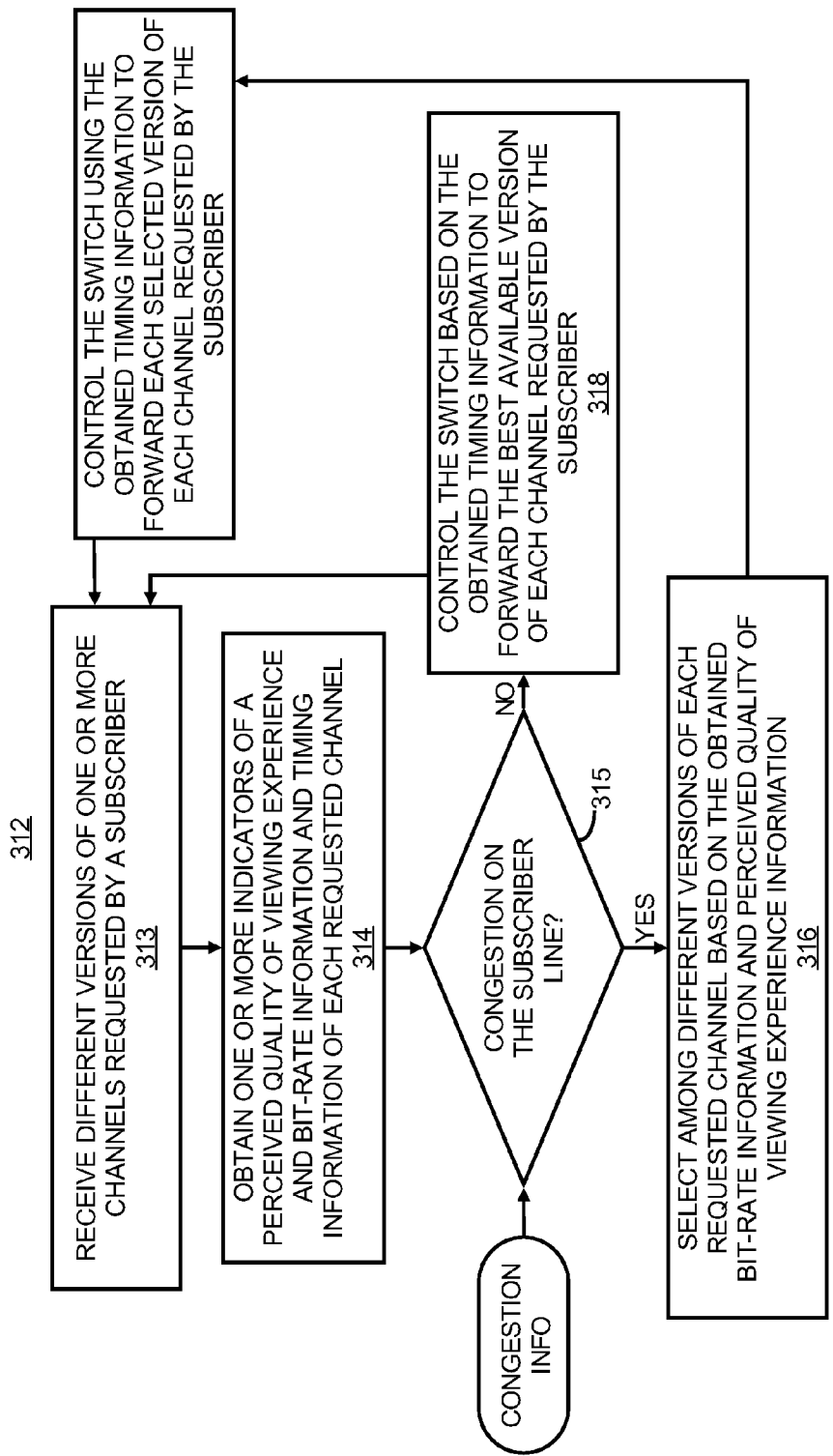
FIG. 3C illustrates a flow diagram of a method for maintaining a perceived quality of viewing after switching events by selecting between different versions of each channel requested by a subscriber, according to an embodiment of the invention.

In addition, a controller, such as a processor (for example, as shown in FIG. 4), ASIC, microcontroller, etc., may implement or execute and the multi-rate statistical switch controller 187A to perform the method 312 described in FIG. 3C. Alternatively, multi-rate statistical switch controller 187A may be configured to operate independently of any other processor or computer device.

The methods 200, 300 and 306 are described herein below with reference to the embodiments of FIGS. 1A through 1C by way of example, and are therefore not meant to be limited by the description of the embodiments of the FIGS. 1A through 1C. The method 312 is described further below with reference to the embodiments of FIGS. 1A-1D and FIGS. 2A through 3B by way of example, and is therefore not meant to be limited to the description of the embodiments of FIGS. 1A-1D and FIGS. 2A through 3B.

With reference first to the embodiment of FIG. 2, there is shown a flow diagram of a method 200 of multi-rate encoding according to an embodiment.

At step 201, a video source stream is received at multiple encoders. For example, video source 102A is received at encoders 106A through 106N. The video source stream from the video source 102A may, for example, be received in a manner described above by way of example in the embodiments of FIGS. 1A through 1E as well as herein below in the embodiments of FIGS. 3A through 3C.

At step 202, the video source stream is aligned among the video encoders. For example, GOP coding modules 138A through 138N start encoding the same picture of an unencoded group of pictures of content received from the video source 102A, and encoding may start at the same time. The video source stream is aligned on a same GOP boundary among the multiple encoders 106A through 106N, on an unencoded-GOP-by-unencoded-GOP basis in a manner described herein.

At step 203, the aligned video source stream is encoded on an aligned-GOP-by-aligned-GOP basis to create a set of multiple encoded GOPs of different bit-rates for each aligned-GOP thereby creating multiple encoded video streams of the same channel, as described herein.

At step 204, the multiple encoded video streams are aligned on an encoded-GOP-set-by-encoded-GOP-set basis, as described herein.

At step 205, the multiple encoded video streams of the same channel at different bit-rates are transmitted forwarded in alignment, on an aligned-encoded-GOP-set-by-aligned-encoded-GOP-set basis. For example, the transport rate buffers 144A through 144N and the transport rate control module 145 forward GOPs so the switch 114 receives the same GOP of different bit-rates at the same time (within some tolerance). The switch 114 switches between the different bit-rate streams as needed in a manner described herein.

Turning now to FIG. 3A, there is illustrated a flow diagram of method 300 for multi-rate encoding, according to an embodiment. Some of the steps contained in the method 300 are similar to the steps discussed above with respect to the method 200 as well as with respect to the methods 306 and 312. The method 300 provides preprocessing of video data after alignment of the GOPs at the multi-rate encoder 101 but before encoding, as in the above-described embodiment of FIG. 1C.

In this, FIG. 3A illustrates a method 300 for aligning and preprocessing unencoded-GOPs to accomplish rate control for transmission, according to an embodiment.

At step 301, the multi-rate encoder 101 receives a video source stream at multiple encoders of, for example, the encoder-set 106 and in a manner described above with respect to the step 201 in the embodiment of FIG. 2.

At step 302, the video source stream is aligned according to the above-described step 202 of the embodiment of FIG. 2.

At step 303, the video source stream is preprocessed as described-herein, for example, in the embodiment of FIG. 1B.

At step 304, unencoded-GOPs are encoded in a manner described at step 303 in the embodiment of FIG. 2.

At step 305, each set of multiple encoded GOPs of different bit-rates is transmitted or forwarded on an aligned-encoded- GOP-set-by-aligned-encoded-GOP-set basis on or after expiration of the GOP time of each aligned set's highest bit-rate encoded GOP, for example, as described herein above in the embodiment of FIG. 1B. The transmission of each encoded—GOP-set occurs after the expiration of the gop_time of the previous GOPs' highest bit-rate encoded-GOP. By forwarding each encoded-GOP-set on or after expiration of the gop_time of the highest bit-rate encoded-GOP of the same encoded-GOP-set, each encoded-GOP-set is forwarded in a manner to be received by the switch the switch 114 at the same time (within some tolerance).

Turning now to FIG. 3B, there is illustrated a flow diagram of a method 306 for multi-rate encoding, according to an embodiment. Some of the steps contained in the method 306 are similar to the steps described above with respect to the methods 200 and 300, as well as with respect to the embodiments of FIGS. 1A, 1B and 1C.

At step 307, the multi-rate encoder 101 receives a video source stream at multiple encoders of, for example, the encoder-set 106 and in a manner described above with respect to the steps 201 and 301 in the embodiments of FIGS. 2 and 3A.

At step 308, the video source stream is aligned according to the above-described steps 202 and 302 of the embodiment of FIGS. 2 and 3A, respectively.

At step 309, an optional preprocessing is performed on a received video stream similar that described above at step 303 in the embodiment of FIG. 3A as well as in the description of the embodiment of FIG. 1C.

At step 310, the aligned video source stream is multi-pass encoded according to the above-description with respect to FIG. 1C.

At step 311, on an encoded-GOP-set-by-encoded-GOP-set basis, each encoded-GOP-set is forwarded to the switch 114 in a manner described above in the embodiment of FIG. 1C.

FIG. 3C illustrates a flow diagram of a method for dynamically balancing a level of congestion on a subscriber-line and available bandwidth on a subscriber-line based on one or more indicators of a perceived quality of viewing experience of each channel requested by, for example, the Subscriber A and in a manner according to features described above in the embodiments of FIGS. 1D and 1E.

It should be understood that method 312 may include additional steps and that some of the steps described herein may be removed and/or modified without departing from the functionality of the method 312. By way of example, the embodiment of FIG. 3C is described by referencing other figures described herein. Therefore, it should be clear that the embodiment of FIG. 3C is not limited to the other embodiments.

At step 313, the switch 189A of FIG. 1D receives different versions of one or more channels requested by the Subscriber A, each version of each channel having a different bit-rate, as described herein.

At step 314, the multi-rate statistical switch controller 187A extracts meta-data embedded, for example, in each channel requested by the Subscriber A. For example, bit-rate information may be hard-coded. Alternatively, bit-rate information and/or one or more version-identifiers may be embedded each channel. In addition, synchronization or timing information may be extracted from each requested channel. For example, these extractions may be performed on an encoded-GOP-set-by-encoded-GOP-set-basis.

At step 315, a decision is made, on a subscriber-per-subscriber basis, as to whether each subscriber has a congested subscriber-line. Each decision is made based on congestion information of the subscriber-line.

At step 316, upon a determination that a subscriber-line is in a congested-state, the channel bit-rate selection module 196A selects among different versions of each channel (requested by the subscriber). The channel bit-rate selection module 196A selects among different versions of each channel to maintain a perceived quality of viewing experience of each channel requested by the subscriber, for example, by switching from a higher-bit-rate version of a channel to lower bit-rate version of the same channel. A perceived quality of viewing experience can be maintained while viewing the lower bit-rate version of the same channel that has an indicator of a higher level of perceived quality of viewing experience at a lower bit-rate. For example, the channel bit-rate selection module 196A balances one or more indicators of perceived quality and the bit-rate information of each requested channel to maintain a perceived quality of viewing experience and select lower bit-rate versions of channels having indicators of higher levels of perceived quality at lower bit-rates. For example, lower levels of complexity of each channel may have indicators of higher quality on lower bit-rate versions of the same channel.

At step 317, upon a determination of which version of each channel to select to forward, the channel forwarding switch-control module 195A uses the synchronization or timing information extracted at step 314 to control the switch 189A to forward each selected version of each channel requested by the subscriber. For example, the channel forwarding switch-control module 195A may control the switch 189A asynchronously according to a schedule. In this, the channel forwarding switch-control module 195A may control the switch 189A to forward each selected version of each requested channel at a next switching opportunity. A next opportunity may be, for example, on boundary of a next encoded-GOP. The multi-rate statistical switching system 170 has to look at the meta data not only for one channel that's being considered to be switched among different versions having different bit-rates, but it has to determine what all other requested channels are doing. For example, the encoder-set that generates each requested channel may embed a first order indicator of a perceived quality as meta data in each encoded video stream. The meta data may include an indicator of perceived quality of viewing experience for each encoded-GOP of each channel. For example, the meta data may include an indicator of perceived quality of viewing experience for each encoded-GOP in each version of a channel. For instance, an indicator of perceived quality of viewing experience for each version of each requested channel may be embedded as meta data. In this, an indicator of perceived quality of viewing experience of each encoded-GOP may be extracted and used to select a different bit-rate version of the corresponding channel for each channel requested by the subscriber to maintain a perceived quality of viewing experience of each channel.

As an option, the encoder-set that generates each requested channel may embed a first and a second order indicator of a perceived quality as meta data in the encoded video stream. For example, a second order indicator of perceived quality of viewing experience may indicate a viewing experience of a future or next encoded GOP. Therefore, the multi-rate statistical switch controller 187A may use a second order indicator of a perceived quality of a future encoded-GOP and a perceived quality of a current encoded-GOP to select which version of a current encoded-GOP is to be forwarded to the subscriber. Here, it is still necessary to determine a perceived quality of viewing experience and bit-rate of all other channels requested by the subscriber. Using a second order indicator of a perceived quality of viewing experience, the system 170 may make a better decision about which version of each channel to forward.

At step 318, upon a determination that the subscriber-line is not in a congested-state, the channel bit-rate selection module 196A selects the best available version of each channel requested by the subscriber. In this, the channel forwarding switch-control module 195A may control the switch 189A to forward the best version of each requested channel at a next switching opportunity of each requested channel. A next opportunity of each requested channel may be, for example, a boundary of an encoded-GOP corresponding to each selected channel. Because each encoded-GOP may be of a variable length, the switching among each channel may be asynchronous with respect to each other.

FIG. 4 illustrates a block diagram of a computer apparatus 400, configured, for example, to implement or execute the methods 200, 300, 306 and 312 as depicted in FIGS. 2, 3A, 3B and 3C. In this, the computing apparatus 400 may be used as a platform for executing one or more of the functions described hereinabove with respect to the multi-rate encoder 101 shown in FIGS. 1A, 1B and 1C as well as with respect to the multi-rate statistical switch controller 187A shown in FIGS. 1D and 1E.

The computer apparatus 400 includes a processor 402 that may implement or executive some or all of the steps described in the methods 200, 300, 306 and 312. Commands and data from the processor 402 are communicated over a communication bus 404. The computer apparatus 400 also includes a main memory 406, such as a random access memory (RAM), where the program code for processor 402 may be executed during runtime, and a secondary memory 408. The secondary memory 408 includes, for example, one or more hard disk drives 410 and/or removable storage drive 412, representing a floppy diskette drive, a magnetic tape drive, a compact disk drive, etc., where a copy of the program code for the methods 200, 300, 306 and 312 may be stored.

The removable storage drive 410 reads from and/or writes to a removable storage unit 414 in a well-known manner. User input and output devices may include a keyboard 416, a mouse 418 and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. In addition, the computer apparatus 400 may include a system board or blade used in a rack in a head end, central office, neighborhood node, a conventional "white box" server or computing device, etc. In addition, one or more of the components in FIG. 4 may be optional (for instance, user input devices, secondary memory, etc).

This present invention may also be implemented wirelessly by using a combination of wired and wireless infrastructure. Furthermore, in any situation where a cable television system becomes band-limited, the present invention may be used to deliver video over such a cable system, or any other band-limited network.

What has been described and illustrated herein are embodiments of The embodiments along with some of their variations. The terms, descriptions and figures used herein are set forth by way of illustration only and are not meant as limitations. Those skilled in the art will recognize that many variations are possible within the spirit and scope of the embodiments, wherein the embodiments are intended to be defined by the following claims—and their equivalents—in that all terms are meant in their broadest reasonable sense unless otherwise indicated.

What is claimed is:

1. A multi-rate statistical multiplexing system comprising:
a congestion-state determination module configured to:
for a subscriber-line providing a plurality of requested channels, receive congestion information of the subscriber-line and determine a congestion-state of the subscriber-line based on a total bandwidth of the subscriber-line and a combined bit-rate of the plurality of requested channels, and for each requested channel provided by the subscriber-line, receive an indicator of quality of a viewing experience;
a channel bit-rate selection module configured to:
select among different versions of each of the plurality of requested channels, each version of a channel having a different bit-rate, wherein the selection is based on a balance of a quality of each of the plurality of requested channels and the congestion information of the subscriber-line; and
a channel forwarding switch-control module configured to control a switch to forward the selected version of each channel based on timing information of each of the plurality of requested channels.

2. A multi-rate statistical multiplexing system according to claim 1, wherein the channel forwarding switch-control unit is configured to control channel forwarding over time in response to the channel bit-rate selection unit selecting among different versions of each channel over time.

3. A multi-rate statistical multiplexing system according to claim 1, wherein the channel bit-rate selection unit is configured to select a lower bit-rate of a first requested channel to maintain a perceived quality of viewing experience of a second requested channel, wherein the quality of viewing experience of the first channel is maintained after the selection.

4. A multi-rate statistical multiplexing system according to claim 1, further comprising:
a switch configured to receive switch control signaling and all versions of each requested channel and to switch among different versions of each requested channel based on the switch control signaling.

5. A method of multi-rate statistical multiplexing comprising:
receiving different versions of a plurality of channels requested on a subscriber-line, each version having a different bit-rate and a corresponding indicator of quality of a perceived viewing experience;
determining a level of congestion of the subscriber-line based on a total bandwidth of the subscriber-line and a combined bit-rate of the plurality of channels requested on the subscriber-line; and
selecting among the different versions of each of the plurality of requested channels based on the level of congestion and one or more indicators of perceived quality of each of the plurality of requested channels,
wherein the selection is based on a balance of the perceived quality of each of the plurality of requested channels with the level of congestion of the subscriber-line.

6. The method according to claim 5, wherein the plurality of channels requested on the subscriber-line comprise a first channel and a second channel, the method further comprising:

forwarding the selected version of the first channel and the selected version of the second channel to a subscriber on the subscriber-line.

7. The method according to claim 6, further comprising: asynchronously forwarding each requested channel with respect to each other.

8. The method according to claim 5, wherein the plurality of channels requested on the subscriber-line comprise a first channel and a second channel, the method further comprising:
switching to a lower bit-rate version of the first channel to maintain a perceived quality of viewing experience of the second channel based on the selecting, wherein a perceived quality of viewing experience of the first channel is maintained after switching to the lower-bit rate.

9. The method according to claim 8, wherein the plurality of channels requested on the subscriber-line comprise a first channel and a second channel, the method further comprising:
switching to a higher bit-rate version of the first channel and a lower bit-rate version of the second channel to maintain a perceived quality of viewing experience of the first channel, wherein the perceived quality of viewing experience of the second channel is maintained after switching to a lower bit-rate.

10. The method according to claim 5, wherein the plurality of channels requested on the subscriber-line comprise a first channel and a second channel, the method further comprising:
receiving a first order indicator of a perceived quality of viewing experience of the first channel and a first order indicator of perceived quality of viewing experience of the second channel; and
controlling the forwarding of each selected version of each requested channel based on the first order indicator of the first channel and the first order indicator of the second channel.

11. The method according to claim 10, further comprising:
embedding the first order indicator of the first channel into a version of the first channel, wherein the embedded first order indicator of the first channel is an indicator of perceived quality of viewing experience of the version of the first channel; and
embedding the first order indicator of the second channel into the second channel, wherein the embedded first order indicator of the second channel is a perceived quality of viewing experience of the second channel.

12. The method according to claim 5, wherein the plurality of channels requested on the subscriber-line comprise a first channel and a second channel, the method further comprising:
receiving a first and second order indicator of perceived quality of viewing experience of the first channel and a first and second order indicator of perceived quality of viewing experience of the second channel; and
controlling the forwarding of each selected version of each requested channel based on the first and second order indicator of the first channel and the first and second order indicator of the second channel.

13. The method according to claim 5, further comprising:
determining the congestion of the subscriber-line on an encoded-group of pictures (GOP)-by-encoded-GOP basis.

14. The method according to claim 5, further comprising:
receiving different versions of a current encoded group of pictures (GOP), wherein one or more versions of the current encoded GOP contains a first order indicator of a perceived quality of viewing experience of the current encoded GOP and a second order indicator of a perceived quality of viewing experience of different encoded GOP.

15. The method according to claim 14, further comprising:
selecting a lower bit-rate version of the current encoded GOP based on the first and second order indicators; and
forwarding the selected version of the current encoded GOP, wherein a perceived quality of viewing experience of the forwarded encoded GOP is maintained after forwarding.

16. The method according to claim 5, further comprising:
asynchronously switching among different bit-rates of each requested channel at a next switching opportunity of each requested channel based on the selecting, wherein a viewing experience of each requested channel is maintained after asynchronously switching.

17. The method of claim 5, further comprising:
assessing an indicator of video quality of a perceived viewing experience of each version of each requested channel.

18. A non-transitory computer readable storage medium on which is embedded one or more computer programs, the one or more computer programs implementing a method for multi-rate statistical multiplexing, the one or more computer programs comprising computer readable code for:
receiving different versions of a plurality of channels requested on a subscriber-line each version having a different bit-rate and a corresponding indicator of quality of a perceived viewing experience;
determining a level of congestion of the subscriber-line based on a total bandwidth of the subscriber-line and a combined bit-rate of the plurality of channels requested on the subscriber-line; and
selecting among the different versions of each of the plurality of requested channels based on the level of congestion and one or more indicators of perceived quality of each of the plurality of requested channels,
wherein the selection is based on a balance of the perceived quality of each of the plurality of requested channels with the level of congestion of the subscriber-line.

19. The computer readable storage medium according to claim 18 wherein the plurality of channels requested on the subscriber-line comprise a first channel and a second channel, the one or more computer programs further comprising computer readable code for:
forwarding the selected version of the first channel and the selected version of the second channel to a subscriber on the subscriber-line.

20. The computer readable storage medium according to claim 18 wherein the multiple channels requested on the subscriber-line comprise a first channel and a second channel, the one or more computer programs further comprising computer readable code for:
switching to a lower bit-rate version of the first channel to maintain a perceived quality of viewing experience of the second channel based on the selecting, wherein a perceived quality of viewing experience of the first channel is maintained after switching to the lower-bit rate.

* * * * *